US007217224B2

(12) United States Patent
Thomas

(10) Patent No.: US 7,217,224 B2
(45) Date of Patent: May 15, 2007

(54) VIRTUAL EXERCISE SYSTEM AND METHOD

(75) Inventor: Tom Thomas, 17176 NE. 5th Pl., Bellevue, WA (US) 98008

(73) Assignee: Tom Thomas, Bellevue, WA (US)

( * ) Notice: Subject to any disclaimer, the term of this patent is extended or adjusted under 35 U.S.C. 154(b) by 476 days.

(21) Appl. No.: 10/918,773

(22) Filed: Aug. 13, 2004

(65) Prior Publication Data

US 2005/0239601 A1    Oct. 27, 2005

Related U.S. Application Data

(60) Provisional application No. 60/495,476, filed on Aug. 14, 2003.

(51) Int. Cl.
*A63B 21/00*    (2006.01)
*A63B 22/00*    (2006.01)

(52) U.S. Cl. ................... 482/8; 482/1; 482/9; 482/900
(58) Field of Classification Search ............... 482/1–9, 482/900–902; 434/247
See application file for complete search history.

(56) References Cited

U.S. PATENT DOCUMENTS

| 6,004,243 | A  |   | 12/1999 | Ewert |
| 6,066,075 | A  | * | 5/2000  | Poulton ........................ 482/8 |
| 6,152,856 | A  | * | 11/2000 | Studor et al. .................. 482/8 |
| 6,336,891 | B1 | * | 1/2002  | Fedrigon et al. ............... 482/8 |

* cited by examiner

*Primary Examiner*—Glenn E. Richman
(74) *Attorney, Agent, or Firm*—Black Lowe & Graham PLLC

(57) ABSTRACT

A virtual racecourse is mapped by uniting digital pictures with GPS and inclinometer data, stored in a recorded course file, presented in distance increments of the racecourse, and accessed for individual and group competition over the internet.

20 Claims, 26 Drawing Sheets

Example Scenario:
A user can participate traveling over a course with other individuals running the playback application.
The race server facilities this as follows.

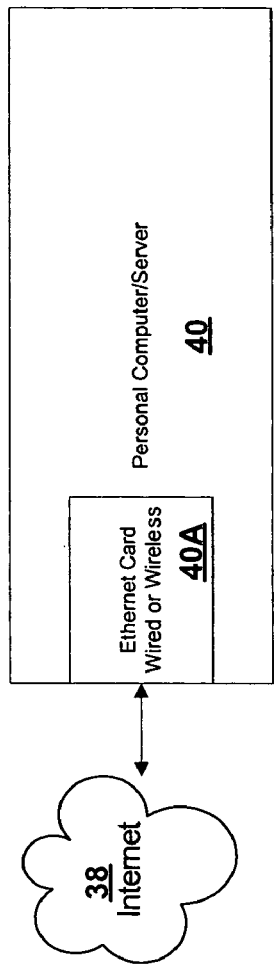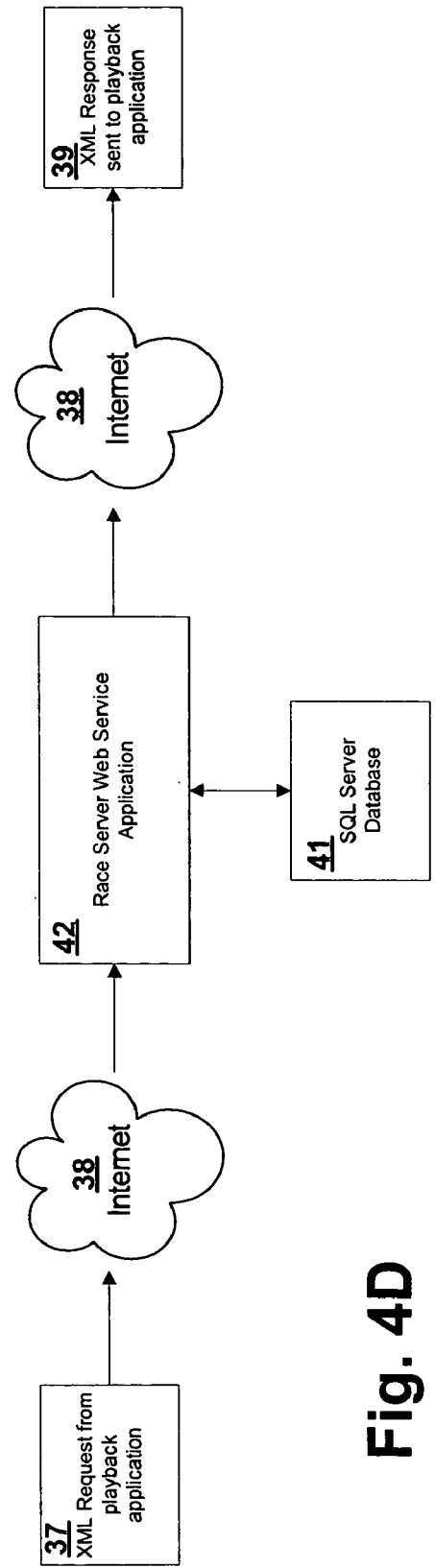
Fig. 4C
Fig. 4D

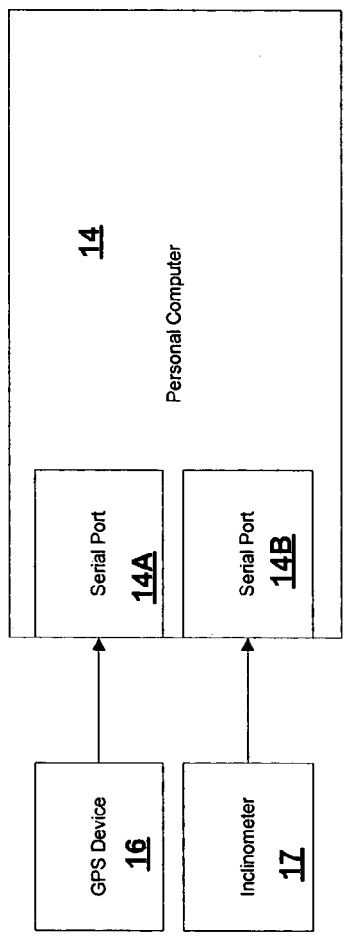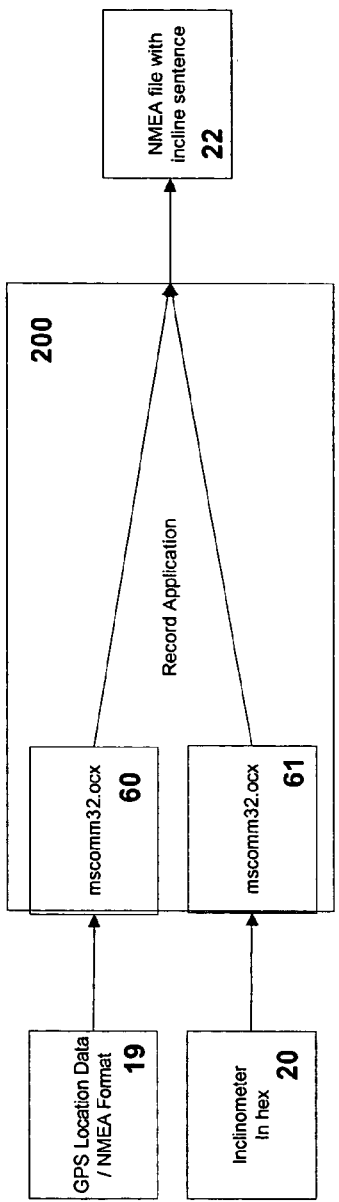

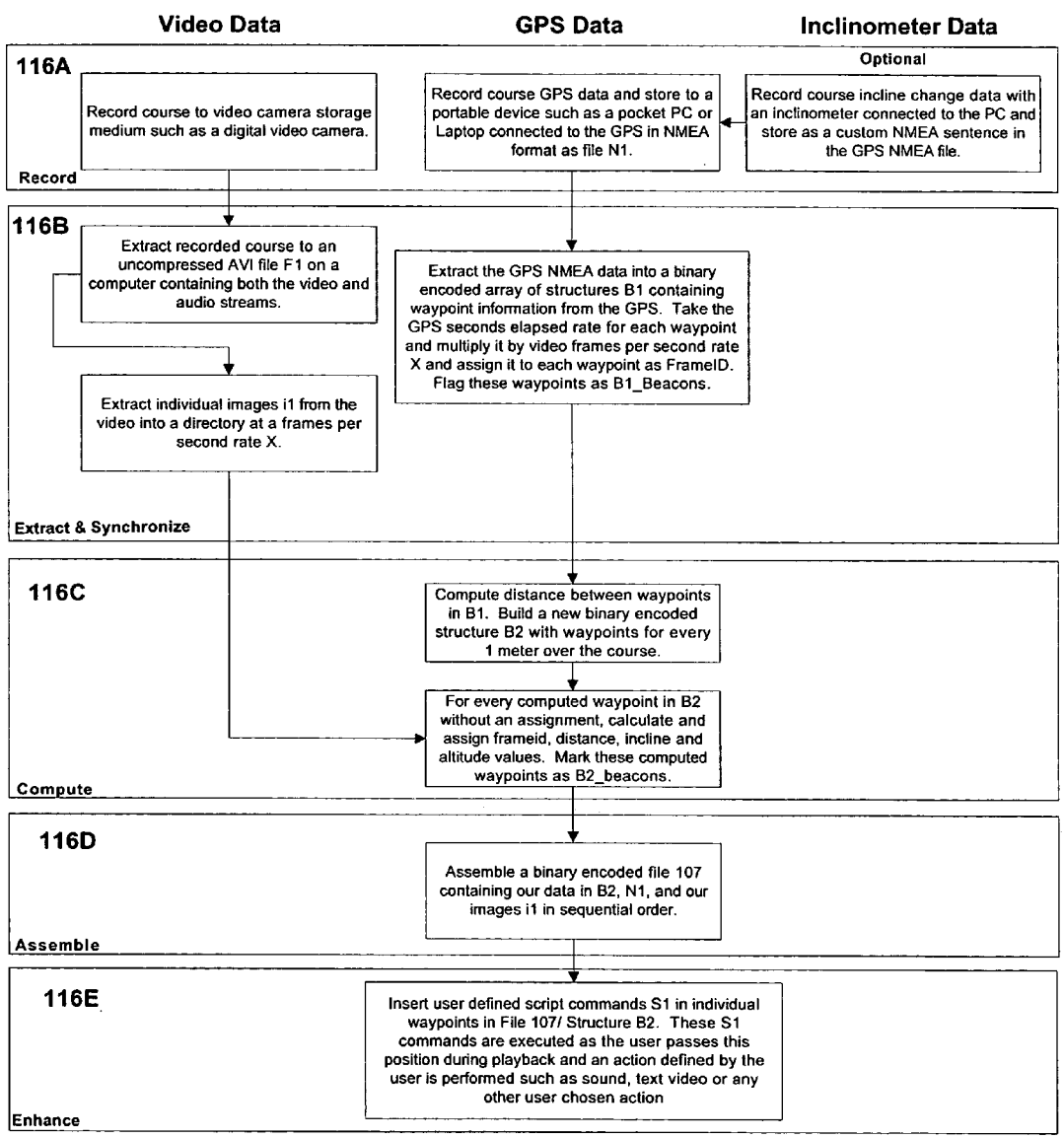
Fig. 6A  Overview - Building a Course File Process Flow

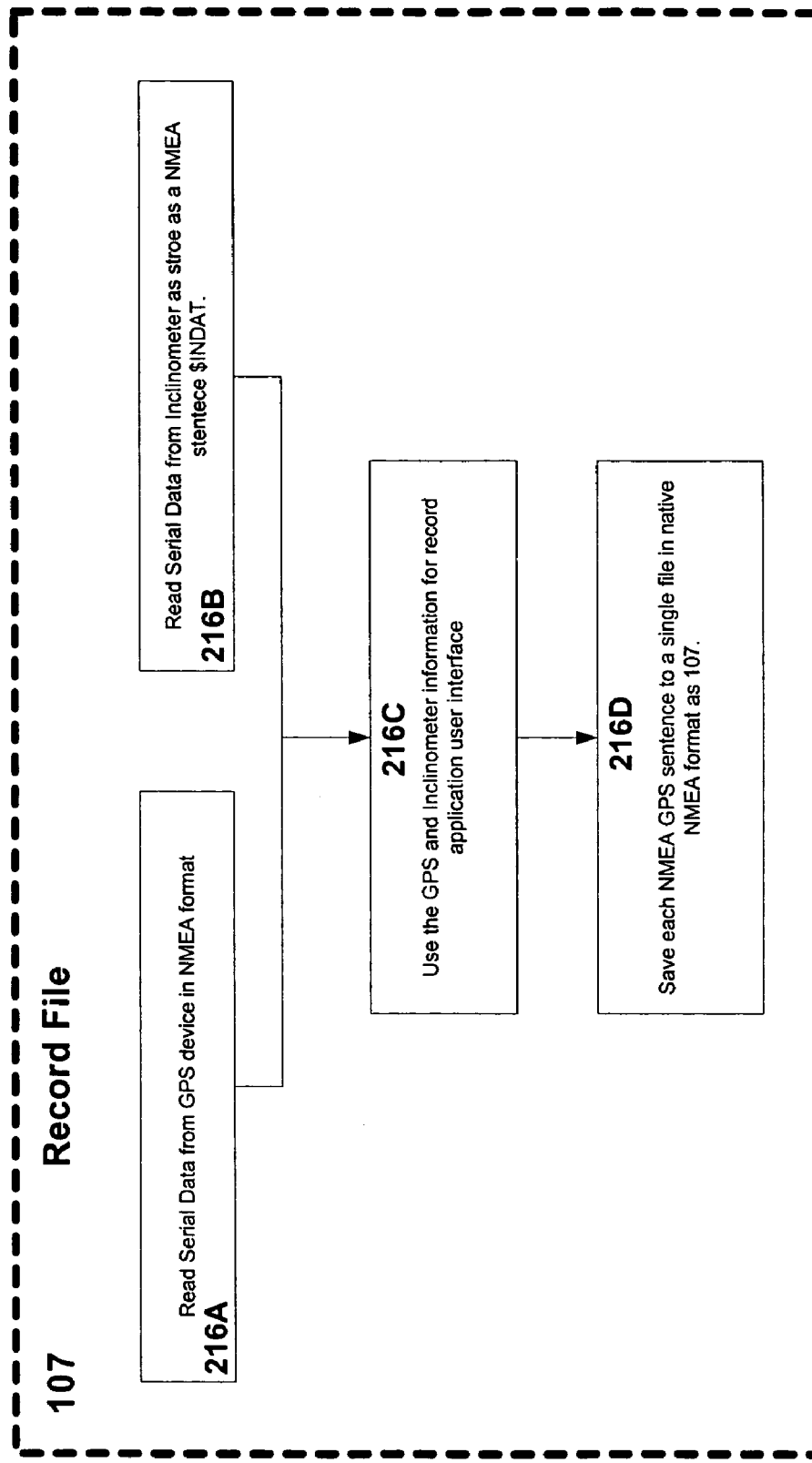

Assemble

107 Create binary encoded course file with GPSStruct() Array B2, NMEA file, and Sequential video images i1.

| File Header | 107A |
|---|---|
| POS_FILE_MARKER | |
| POS_SUMMARY_XML_MARKER | |
| POS_COURSE_XML_MARKER | |
| POS_FIRST_IMAGE_MARKER | |
| POS_NMEA_COURSE_MARKER | |

| SUMMARY_XML_MARKER | 107B |
|---|---|

| SummaryXMLHeader | 107C |
|---|---|
| Start | |
| Length | |

| Summary XML | 107D |
|---|---|

| COURSE_XML_MARKER | 107E |
|---|---|

| CourseXMLHeader | 107F |
|---|---|
| Start | |
| Length | |

| Course XML | 107G |
|---|---|

| IMAGE_MARKER | 107H |
|---|---|

| ImageHeader | 107J |
|---|---|
| FrameID | |
| Start | |
| Length | |

| Image | 107K |
|---|---|

(Repeat)

| NMEA_COURSE_MARKER | 107L |
|---|---|

| NMEACourseHeader | 107M |
|---|---|
| Start | |
| Length | |

| NMEA Course | 107N |
|---|---|

Insert the data into the binary encoded file in a defined sequence 108

Fig. 6E

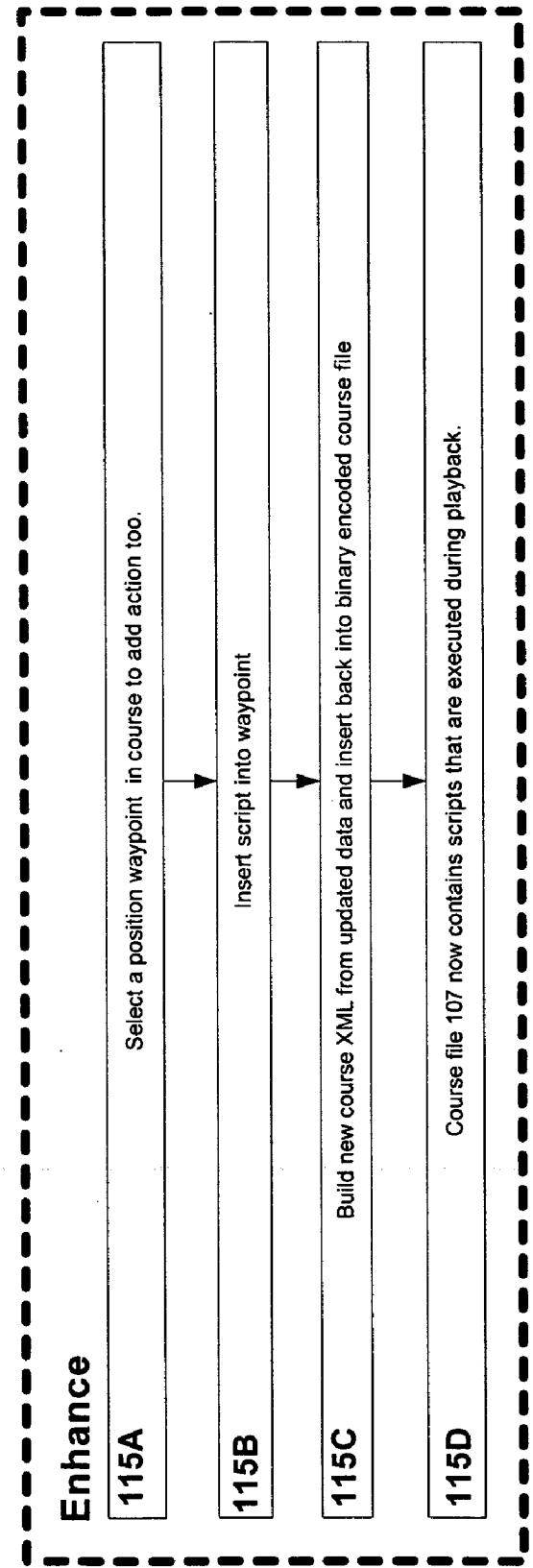

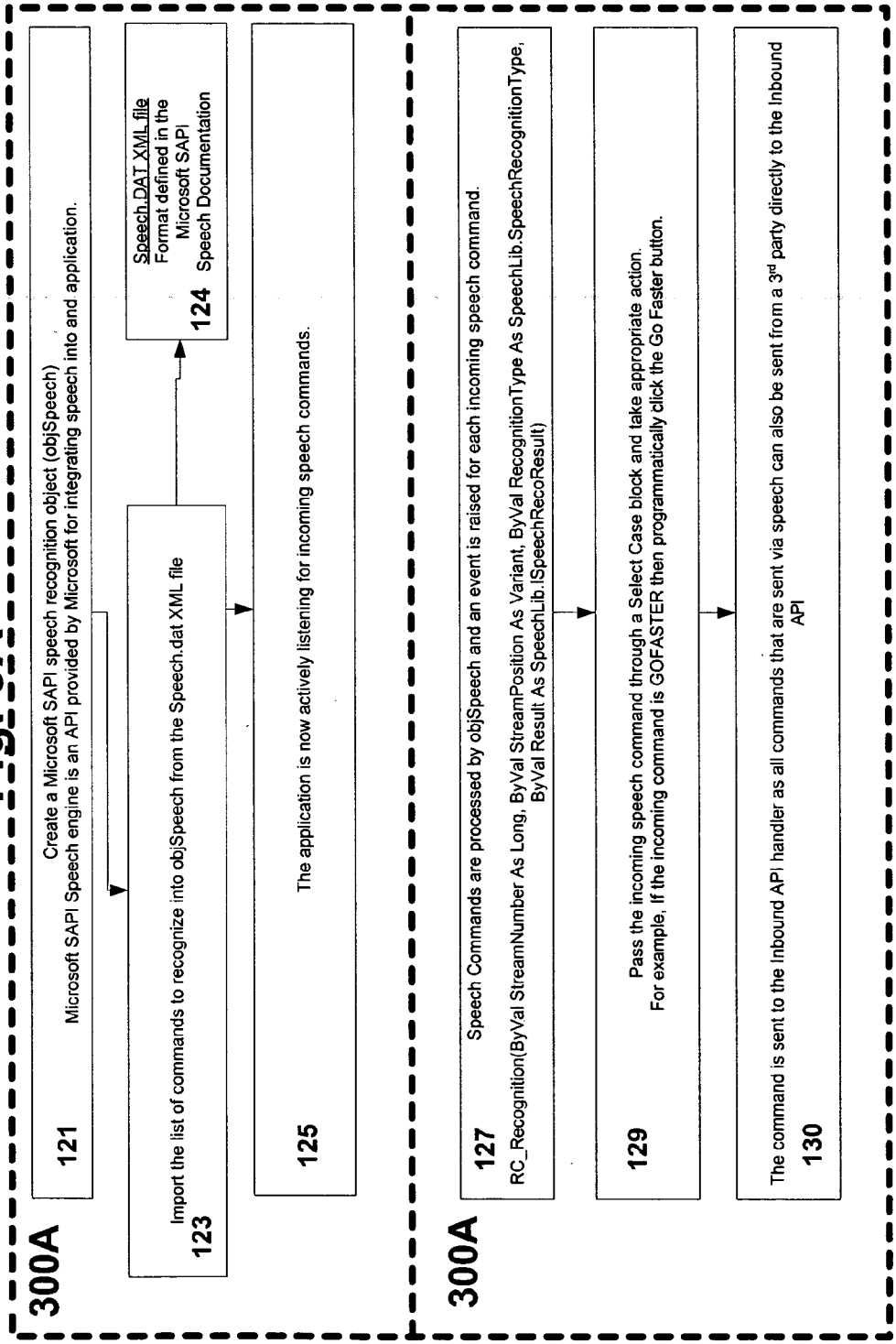

Fig. 16

VIRTUAL EXERCISE SYSTEM AND METHOD

PRIORITY CLAIM

This application claims priority to U.S. provisional patent application Ser. No. 60/495,476 filed Aug. 14, 2003 and is incorporated by reference in its entirety as if fully set forth herein.

FIELD OF THE INVENTION

This invention pertains to the field computer exercise-based games, particularly competition games accessible over the Internet.

BACKGROUND OF THE INVENTION

Computer competition gaming between people on home personal computers or conducted across the Internet through gaming websites is a popular pastime, and includes arcade style racing games. The arcade style racing games commonly pit automotive, boat, or futuristic space ships on a cartoon looking racetrack.

Prior art for displaying racecourse related images associated with exercise equipment include Ewert (U.S. Pat. No. 6,004,243, Dynamic Real Time Exercise Video Apparatus And Method) and Studor et al., (U.S. Pat. No. 6,152,856, Real Time Simulation Using Position Sensing). Ewert teaches an apparatus and method for interactively controlling the rate of real-time video playback using a bicycle and a TV connected with a video game CD player having a pre-recorded CD. The video playback rate from the pre-recorded CD is modified by altering the duration time stamp of video frames that is determined from an external lookup table. Ewert uses separate video and data files. The external lookup table lacks global positioning system (GPS) data which otherwise would provide the users map position in a racecourse. Ewert is limited to solitary interaction with the video game CD player. Ewert lacks an input applications programming interface (API) that allows control of the application, for example speech commands and other user-insertible actions that are executed at GPS waypoints.

Studor et al. teaches the use of GPS and, like Ewert, uses separate movie files and external data tables to determine video frame rate. Though video presentation is improved over Ewert by the use of GPS data, Studor's playback videos are of lower resolution and seemingly unrealistic because it is time-based. Studor's teaching is not realistic because it lacks a distance-based method to compute video frames by defined distance increments. Accordingly, Studor does not precisely incorporate GPS data due to these time-based limitations.

There is a need for an improved virtual exercise system with realistically presented images accessed by individuals or remotely between user groups.

SUMMARY OF THE INVENTION

The present invention is a system and method for accessing an improved resolving image stream defined in distance increments and associated with GPS data. The improved GPS dataset combined with the plurality of images can be used by a solitary user or as a group via the internet to enable group competition.

A preferred embodiment includes an image stream of a virtual racecourse presented on a video display that is derived from a single proprietary file that contains both video images and data sets. The displayed, virtual racecourse allows individual and group competitions between runners using voice command-operable treadmills to complete the virtual racecourse in relation to the presentation of images from the proprietary image stream. The virtual racecourse is made by assigning FrameIDs to each image where time and FrameRate are synchronized, assigned FrameIDs, and associated with waypoints defined by global positioning data. Each waypoint includes: distance elapsed, latitude, longitude, altitude, incline, direction, and recorded speed. As the user travels the course the image frame rate is adjusted using formulas pertinent to the virtual racecourse. A waypoint increment of 1-meter is used in another preferred embodiment.

The display of the Virtual Treadmill presents an image window of the terrain, a map window showing the location of the runner in the racecourse, an alphanumeric data window and a graphical data window. Attached to the runners are instruments that measure and transmit physiologic-related data to the computers for presentation in the alphanumeric and graphical data windows. Both windows present racecourse-related and physiologic-related data that varies according to the changing terrain presented during the running of the virtual racecourse and the runners' responses to the terrain as presented in the video image stream.

The alphanumeric data includes racecourse-related data and physiologic-related data. The racecourse-related data includes distance run, elapsed time of distance run, updated average speed, distance remaining, estimated time to complete the distance remaining based on the updated average speed, and updated incline ratio. The physiologic-related data presented includes heart rate, power, oxygen utilization, energy, and percentage of target goal. The graphical data includes racecourse distance, racecourse altitude, racecourse incline, runner heart rate, and runner speed.

The Virtual Treadmill was a microprocessor based computer system to unite digital pictures with global positioning date to receive and store a virtual racecourse. Individual users and groups may access to stored virtual racecourse to permit individual and group completions.

BRIEF DESCRIPTION OF THE DRAWINGS

FIG. 4C shows the hardware connections for the Race Server;

FIG. 4D is a functional block diagram of the race server software;

FIG. 5A shows the hardware connections for the record station 12;

FIG. 5B is a functional block diagram of the record application software;

FIG. 6A is a overall process flow chart of the course file creation process;

FIG. 6B is a description of the course file record process;

FIG. 6E is a description of the course file assembly process;

FIG. 6F is a description of the course file script enhancement process;

FIG. 9A is a processing speech commands of the speech command block 300A;

FIG. 9B is a data sentence examples of speech commands;

FIG. 16 is a screenshot showing race detail schedule and appointments;

ACRONYMS AND DEFINITIONS

.JPG A file format for pictures and images.
.TSD Treadmill Software Distance. The file extension for the record/playback files.
.ZIP A compressed file containing other files.
ACSM American College of Sports Medicine.
API Application Programming Interface
Array A group of data in buckets where each bucket is referenced by it's number
Calorie or kcal A Unit of Energy & Work A calorie will raise the temperature of 1 gm water by 1 degree C. A Calorie (used by nutritionists)=1000 calories=1 kilocalorie.
Direct X Microsoft's SDK to access multimedia devices
DV Digital Video
Fat A Unit of Energy and Work 9 kcals=1 gram of fat
Fireware IEEE A PC port similar to USB or Serial 1394
GPS Global Positioning System. A device for determining geographic locations
HTML Hyper text markup language. An agreed upon format for formatting text to be displayed by an internet browser line Internet Explorer or Netscape
HTTP Hyper text transfer protocol. A TCP protocol for sending and receiving data over the internet or a TCP/IP network.
IP address The unique address of a computer or network device connected to a TCP/IP network.
MET Unit of Power
  Exercise physiologists use a unit called the MET. A MET is the oxygen uptake of 3.5 ml per kilogram per minute. For a 60 kg person it is 210 ml $O_2$/min. Energy production in animals is related to oxygen consumption. The amount of energy depends upon the type of fuel being oxidized (carbohydrate, fat, protein), but a good average figure is 4.82 kcal per liter of oxygen consumed. Using this figure, the 60 kg person has a power output of:
  Power output (1 MET)=(0.21 L $O_2$/min) (4.82 kcal/L $O_2$)=1.01 kcal/min
NMEA 0183 National Marine Electronics Association. A protocol that represents GPS position data
OCX A software component often exposed by a programming interface or API.
RS232 A protocol for sending and receiving data at 10-volt logic levels.
SAPI Microsoft's Speech Recognition SDK
SDK Software Development Kit
Serial A Serial or COM port connection on a PC. Also know as an RS232 port
Socket Another name for a TCP/IP port
Structure A user defined method to store data.
TCP/IP Transmission Control Protocol/Internet Protocol. A transport protocol used by computers to communicate over the internet
TCP/IP Port A port number that the TCP/IP protocol communicates over. Most public websites are using port 80.
TTL A protocol for sending and receiving data at 5 volt logic levels.
USB Universal Serial Bus. A port like a Serial port on a PC
VO2 Max A measure of the maximum amount of oxygen that a person can take in and process during exercise. It is measured in milliliters of oxygen per kilogram of body mass per minute. It is one measure of a persons athletic potential.
Watt Unit of Power watt=joule/sec
XML Extensible Markup Language. An agreed upon universal format for storing data.

DETAILED DESCRIPTION OF THE PREFERRED EMBODIMENT

Preferred embodiments of the virtual exercise system are shown in FIGS. 1–21.

Figure 1:
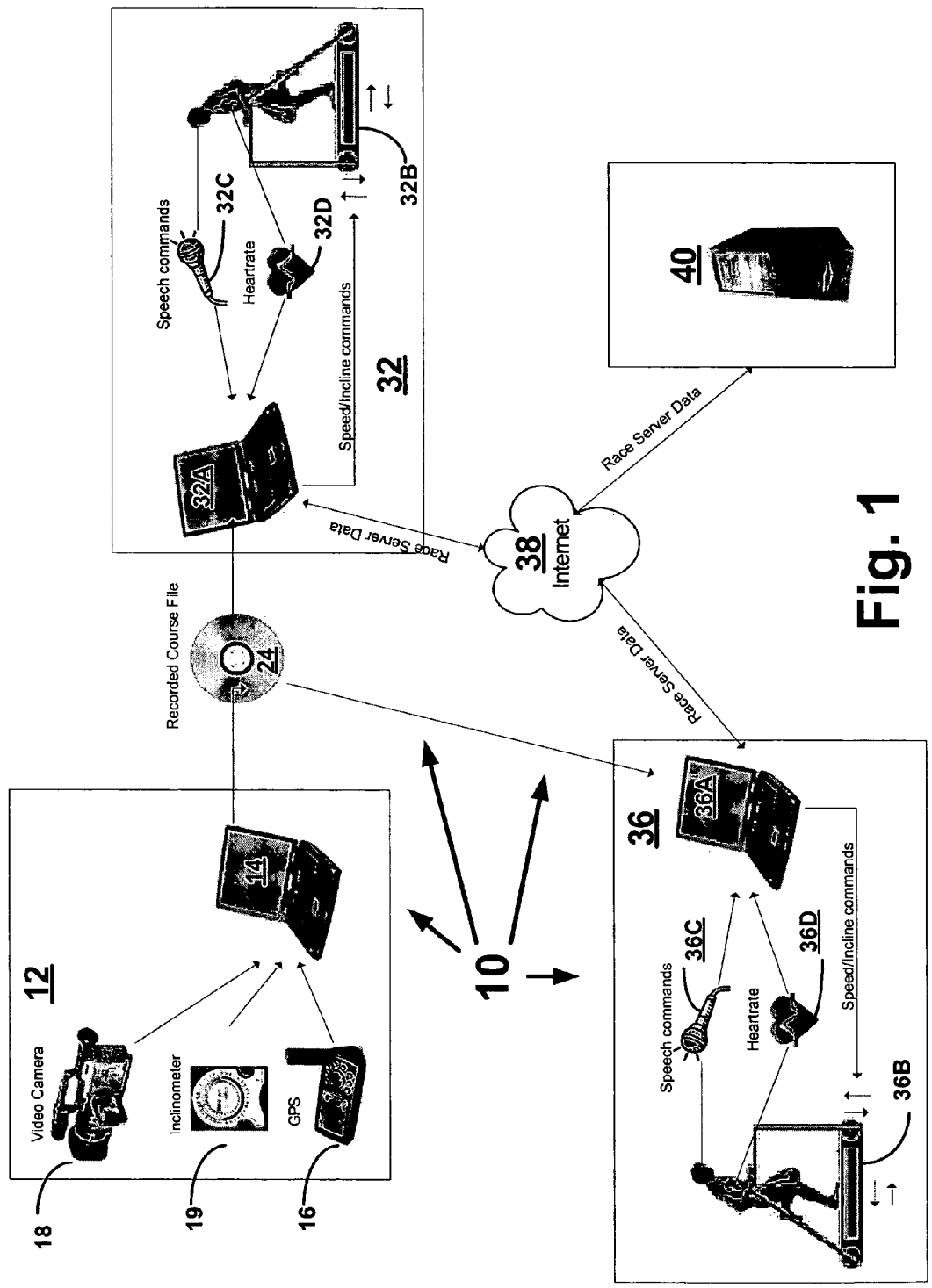
FIG. 1 is a block diagram of the virtual exercise system.

FIG. 1 is a block diagram of a virtual exercise system 10 and includes a record station 12, a first user station 32, a second user station 36, and a race server 40. Two user stations (32 and 36) are illustrated in FIG. 1, but a single user station, for example, user station 32 solely, or more than two user stations may be included in the virtual exercise system 10. The record station 12 includes a record computer 14, a GPS 16, and a video Camera 18, and an inclinometer 19. Via software described below, the record station 12 records digital images and combines with GPS data to make a recorded course file 24, here illustrated as a burned-in DVD-ROM. The recorded course file 24 may exist in other digital storage media, for example magnetic based media. The recorded course file 24 includes the visual images, GPS data, including mapping coordinates of a virtual racecourse presented to the first and second user stations 32 and 36.

The first user station 36 includes a first user computer 32A, a first treadmill 32B, a first microphone 32C, and a first cardiac monitor 32D. The first user computer 32A receives the virtual racecourse from the recorded course file 24. The second user station 36 is remotely located from the first user station 36 and includes a second user computer 36A, a second treadmill 36B, a second microphone 36C, and a second cardiac monitor 36D. The second user computer 36A receives the virtual racecourse from the recorded course file 24.

The first and second user computers 32A and 36A receive position related data stored on the race server 40 via connections with the Internet 38. The first and second treadmills 32B and 36B speed and incline levels are adjustable by each user via speech commands communicated through first and second microphones 32C and 36C by each respective user. The first and second microphones 32C and 36C are preferably in wireless communication to each respective first and second user computer 32A and 36A to permit hand-free operation, but may be alternatively be in wired contact. Mechanical parameters of the treadmills, such as the speed and incline levels, are controlled autonomously and independently by each first or second user, or alternatively, may be controlled by the first user solely, may be controlled by the second user solely, or may be controlled by the race server 40 via race server data communicated by the race server 40 to the first and second user computers 32A and 36A via connection with the Internet 38.

Heart rate data from each respective user is communicated to the first user computer 32A from the first cardiac monitor 32D or the second user computer 36A from the second cardiac monitor 36D. The first and second cardiac monitors 32D and 36D are preferably in wireless communication to each respective first and second user computer 32A but may be alternatively be in wired contact. Race Server 40 is responsible for sharing users information while participating in a course with multiple users.

Figure 2:
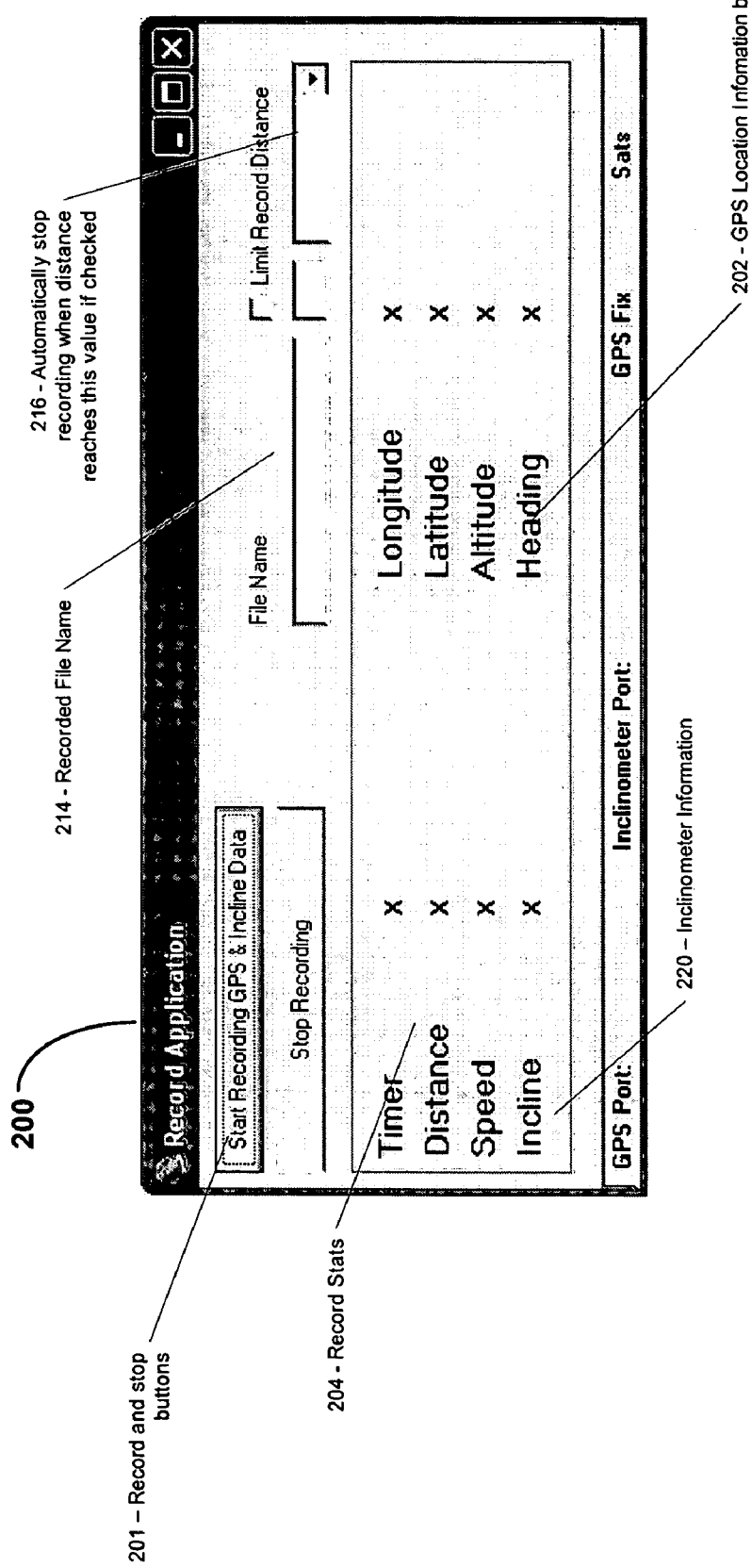
FIG. 2 is a block diagram of the Record Application.

FIG. 2 is a record application screenshot. Record application screenshot 200 includes record and stop buttons 201, a GPS location information bar 202, Record status section 204, Inclinometer information 220, a recorded file name input box 214, a record distance box 216 which can be adjusted into English and metric units.

Figure 3:
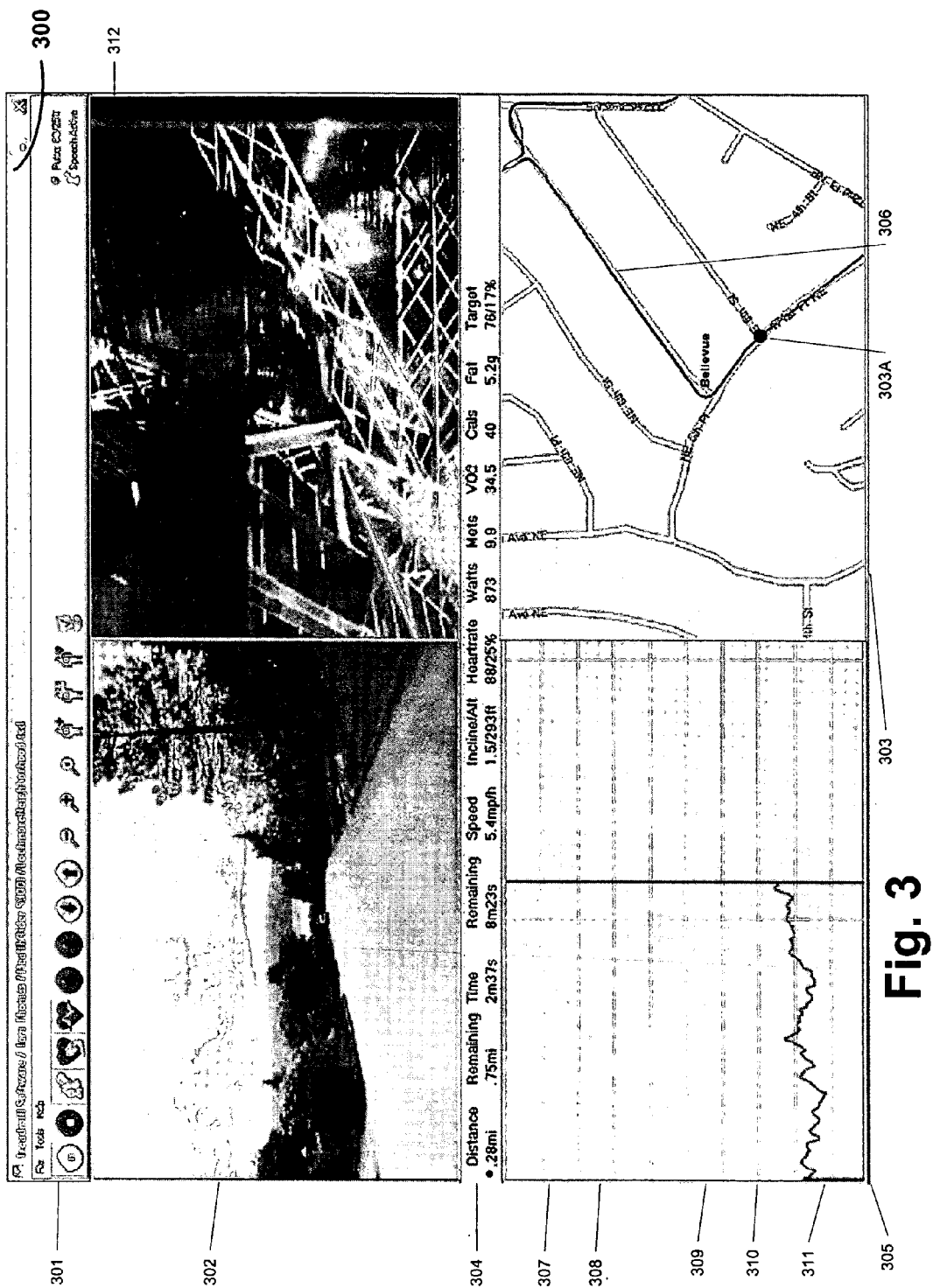
FIG. 3 is a block diagram of the Playback Application.

FIG. 3 is a playback application screenshot. The playback application screenshot 300 includes a toolbar window 301, an image window 302, a map window 303, a data window 304, a chart window 305, and a TV window 312. The map window 303 includes a position icon 303a that shows the position of the competitor in the race. The position indicator 303A shows the current position of the runner and is trailed by or within a course outline 306 drawn over the map to indicate the course traveled thus far and remaining. The data window 304 includes course related information and runner related information. The course related information includes distance covered, the remaining time in the course to complete the race, the current speed of the runner, and the incline altitude of the course as currently experienced by the runner. The runner related data is physiologic related and includes the heart rate of the runner, the unit of power expanded by the runner expressed in watts, the unit of power expanded by the runner expressed in mets units, the volume of the maximum amount of oxygen that can be utilized by a person doing exercise expressed as VO2 max, the unit of work or energy expanded by the runner expressed in calories or cals, the unit of energy and work expressed as fat, and the target percentage. The chart window 305 includes a plurality of lines and bar graphs that graphically describe the race course related and runner related data. In the chart window 305 is a plot of the course altitude 307, the runner's speed 308, the user position status bar 309, a percent grade 310, and a heart rate percent 311.

Figure 4A:
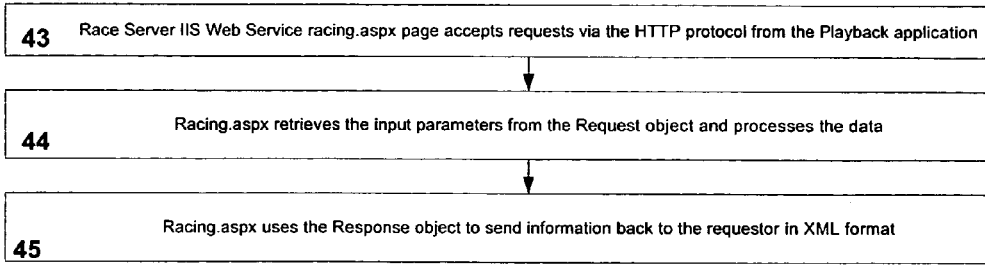
FIG. 4A is a is a race server web service protocol.

FIG. 4A is the race server web service. The race server web service listens for HTTP requests within page racing.aspx page 43, racing.aspx retrieves the input parameters from the Request object and processes the data 44. Racing.aspx uses the Response object to send information back to the requestor in XML format 45.

Figure 4B:
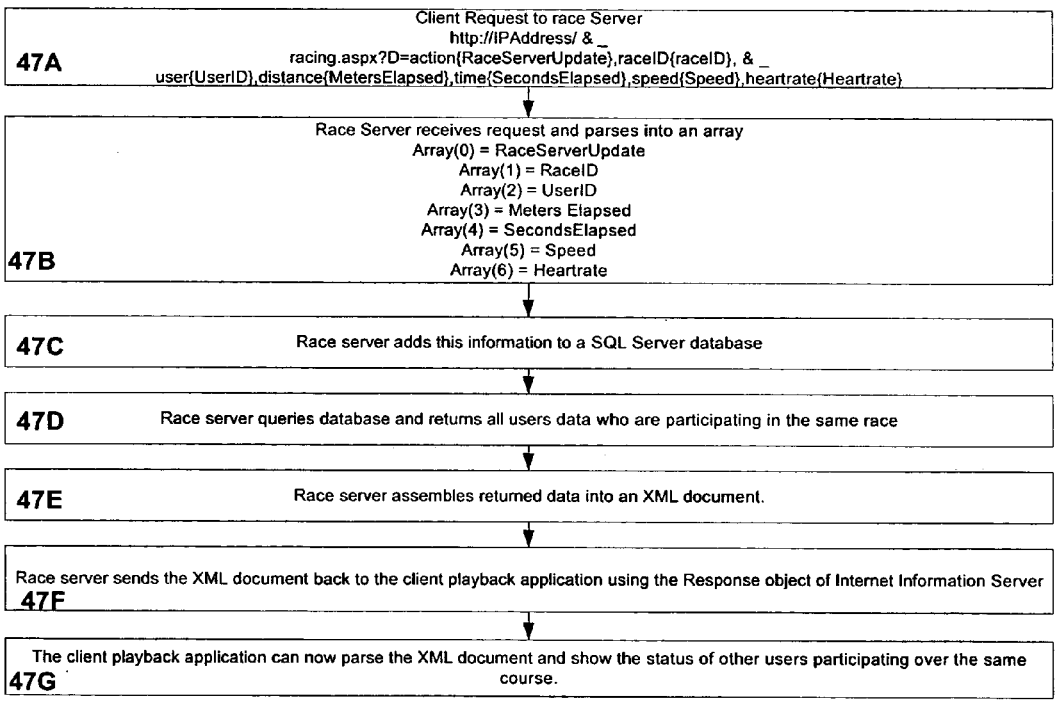
FIG. 4B is an example scenario of FIG. 4A.

FIG. 4B is an example scenario of FIG. 4A. FIG. 4B illustrates the flow chart of how a user can participate traveling over a course with other individuals running the playback application 300. The race server facilitates this with a client request to race server 47A. The client request to race server 47A includes an HTTP://IPAddress/ & _ racing.aspx?D=action{RaceServerUpdate}, raceID {raceID} and includes a data stream of user id, distance, time, and heart rate. An example of data parsing is shown on block 47B where the Race Server receives the request and parses it into an array as shown in block 47B. The array includes RaceServerUpdate, RaceID, UserID, an array of Meters Elapsed, an array of Seconds Elapsed, an array of Speed, and array of heart rate. Thereafter, the arrays of 47B are added to an SQL Server database 47C. Thereafter, at step 47D, the race server queries for user data and returns all users data for those users that are participating in the same race. At step 47E, the race server assembles returned data into an XML document. Thereafter, at step 47F, the race server sends the XML document bgack to the client play back application 300 using the response object of the Internet Information Server. Then, at step 47G, the client layback application 300 parses the XML document and displays the status of other users participating over the same virtual racecourse.

FIG. 4C shows the hardware components for the race server. Computer 40 is running Internet Information Server and accepts requests from clients via the Ethernet card 40A which is connected to the internet 38

FIG. 4D shows the flow of a client request to the race server and the response sent back to the client. The client 37 sends an request in XML over the internet 38 to The race server application 42 running on server 40. The race server application stores data for each runner in a SQL Server database 41. It queries the database for data on participants of the same race as the requestor and send it back over the internet 38 as an XML response 39 to be processed by the playback application client participating in the race.

FIG. 5A shows the hardware connections for the record station 12. The hardware connections includes a serial port 14A connected to the personal computer 14 and a serial port 14B also connected with the computer 14. The GPS device 16 is connected to the serial port 14A, and the Inclinometer 17 is connected to the serial port 14B.

FIG. 5B is a functional block diagram of the record application software. The record application software 200 includes two serial port processing objects block 60 and 61. The GPS block 60 receives GPS location data and NMEA format from the data block 19. The Inclinometer block 61 receives Inclinometer data as an incline value in hex format from the stream from Inclinometer 20. Data from the GPS and Inclinometer blocks are combined into a single file 22 in NMEA format where each NMEA sentence from the GPS is saved to the file and every 1 second the incline data from the inclinometer is saved to the file in a custom NMEA sentence as follows $INDAT,Time,Incline where $INDAT is the sentence definition Time is the last UTC time from the GPS, and Incline is the Incline value from the inclinometer.

FIG. 6A is an overview of building a course file. Detailed information is provided for each stage in 6B, 6C, 6D, 6E and 6F. A user will record a course 116A by traveling a course with a video camera recording the traveled course to video tape and with a GPS and optional inclinometer recording the GPS and inclinometer data to file via a pc connected to each device. The user will then extract and synchronies 116B the video frames, GPS, and inclinometer data to a PC. A time synced dataset is created from the GPS and Inclinometer NMEA data and video frame id are assigned to each waypoint in the dataset where the extracted frames per second is a known value. The data provided by the GPS is scrubbed 116C from a time based dataset to a distance based dataset where GPS waypoints are computed for every 1 meter over the recorded course. All computed waypoints will be populated with latitude, longitude, altitude, record speed, heading, incline, and video frame id. The data has now been scrubbed and used to assemble 116D the data into a single file where the extracted video frames, scrubbed data and original NMEA data are encoded into the file for use by the playback application. A user can now enhance 116E the data by inserting custom actions defined as scripts into individual waypoints within the scrubbed dataset. These custom actions will be executed when a user of the playback application passes this waypoint while traveling through the virtual course. The file is now ready for use by a user of the playback application.

FIG. 6B describes the process of recording the GPS and Inclinometer data for a course file. The GPS data is read from the GPS in NMEA format 216A. It is then parsed and used in the user interface of the record application connected to the GPS 216C. The NMEA sentence is then stored to a file in its native NMEA sentence format 216D. The Inclinometer data 216B is read from the inclinometer connected to the record PC. The value is used to build a custom NMEA sentence type as follows. $INDAT,TIME,INCLINE where $INDAT defines the NMEA sentence type, TIME is the most recent UTC time from the GPS, and INCLINE is the incline value from the inclinometer. This data is created every time the GPS gives us a different UTC time. The data is then used to display incline in the record application user interface 216C. The custom NMEA sentence is then written to the file 216D.

Figure 6C:
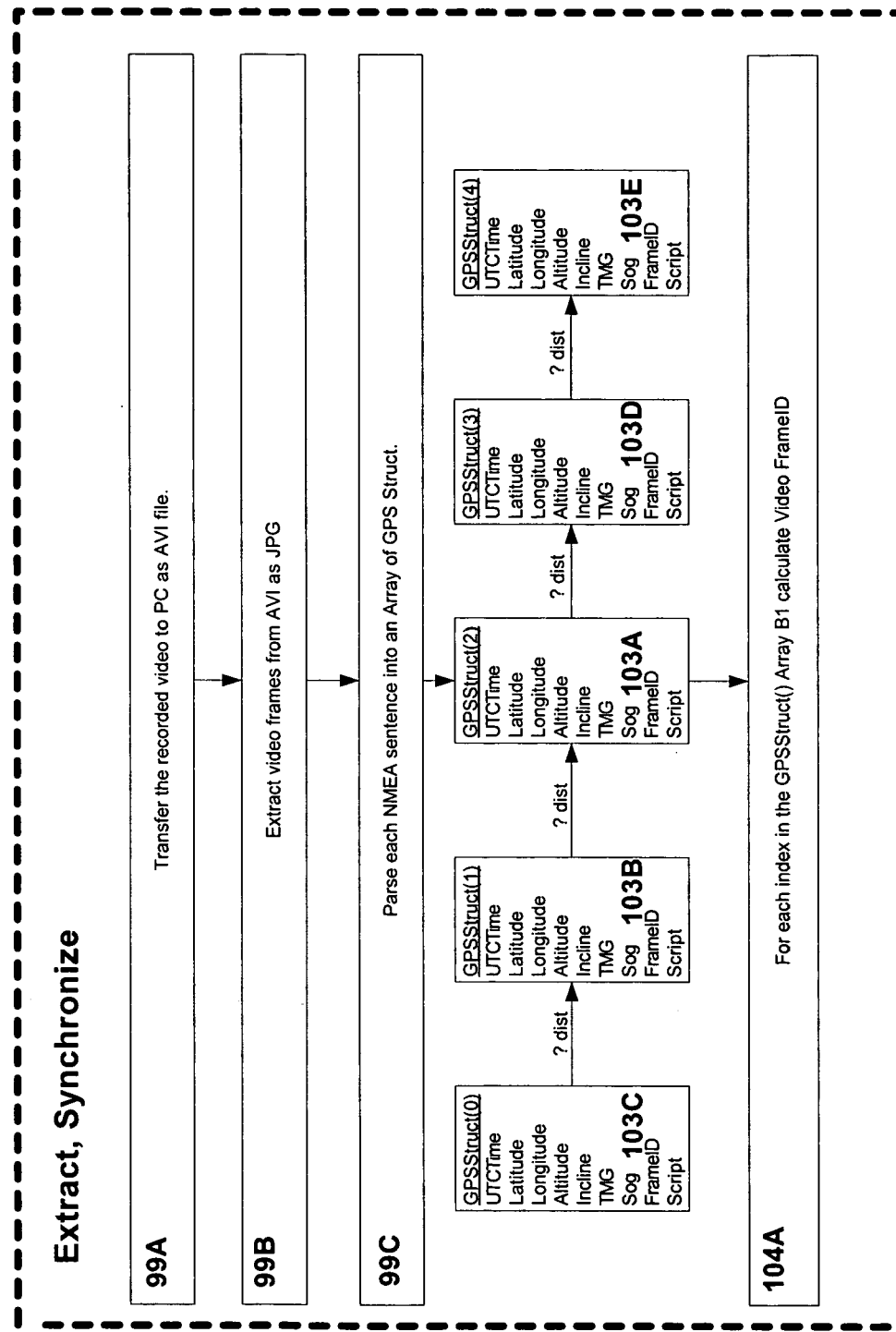
FIG. 6C is a description of the course file extraction and synchronization process.

FIG. 6C Extracting and synchronizing the video frames waypoints within the recorded NMEA data. 99A Copy the recorded video to the PC as an AVI file. This can be accomplished with a 3rd party application such as Adobe AfterEffects. 99B Extract individual images from the AVI file and saves the individual images to disk as JPG files. The can also be accomplished with a 3rd party application such as Adobe AfterEffects. Images are extracted at a pre determined frames per second rate and saved in a directory on the PC in JPG picture format as x.JPG where x is the sequential frame number extracted. 99C—The NMEA data is then read and parsed into individual waypoints where UTC time is a unique identifier for each waypoint represented as 103A, 103B, 103C, 103D, and 103E. The processing involves parsing the sentence into a structure data type where each fields are defined by the NMEA protocol specification. Video FrameID is assigned to each waypoint 104A where time elapsed in seconds for each waypoint is multiplied by the video extracted frames per second rate. Distance between waypoints will be an arbitrary value depending on speed during the record process identified as SOG.

Figure 6D:
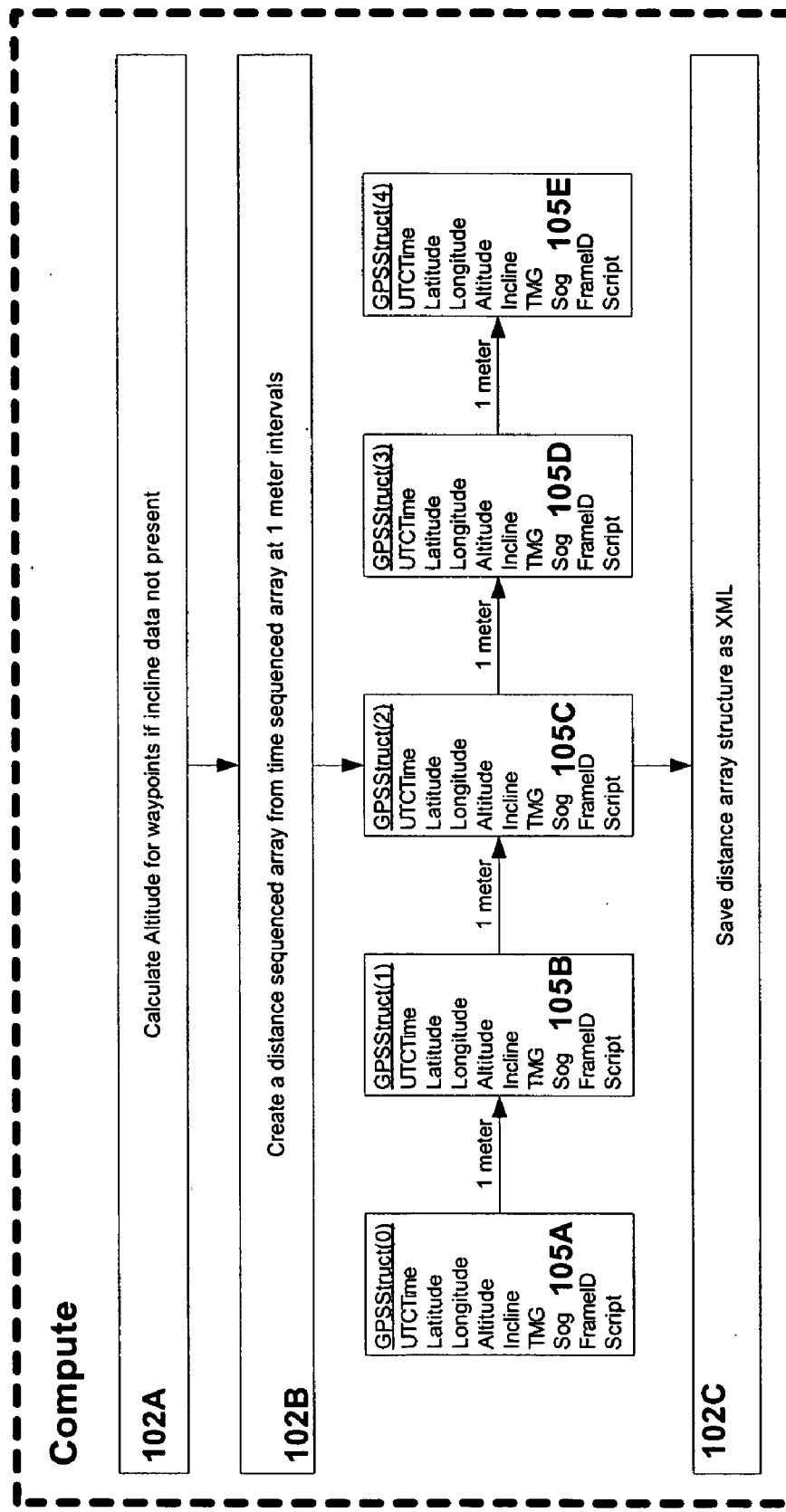
FIG. 6D is a description of the course file computed data process.

FIG. 6D—Converting the time formatted waypoint array created in 6C into a distance formatted waypoint array. First check to see if incline is present in the time formatted waypoint array 102A. If incline is not present then an inclinometer was not used in the record process and incline for each waypoint must be calculated by altitude captured from the GPS and distance change between waypoints using the following formula: dAngle=Atn((gpsData(lEndIndex).ALT—gpsData(lStartIndex).ALT)/dDistanceToNextAlt)*(180/PI).

102B—Create a distance formatted waypoint array where each waypoint represents a 1-meter change to the next waypoint in the array. Calculate distance in 1-meter intervals between waypoints in the time formatted waypoint array and create a new array where each array element represents 1 element in the distance array. During this process calculate longitude, latitude, altitude, incline for these computed waypoints. Carry over SOG "speed over ground" and TMG "trip made good, or heading", from the time formatted array. The result is a distance formatted waypoint array as illustrated in 105A, 105B, 105C, 105D, 105E.

102C—Convert distance waypoint array structure into an XML document to be used by the playback application.

FIG. 6E—Create the final binary encoded file by assembling the Images, NMEA, and XML course data into a single file 107. 107A to 107M describes the binary file encoding format.

File Header 107A stores pointers to the markers indicating the start of each section within the file. 107B is a summary marker a constant integer identifying the start of the summary section in the file. 107C is the Summary XML Header which defines the start and length of the Summary XML string. 107D is the summary XML string. The summary XML is user information about the course for instance the title, date of creation, location, and author name. 107E is a course marker, a constant integer identifying the start of the course section in the file. 107F is the course XML header defining the start and length of the course XML string. 107G is the course XML string. 107H is an image marker a constant integer identifying the start of the image section in the file. The $1^{st}$ image marker is the marker identified in 107A. 107J is the image header describing the start sequential frame id and length in bytes of the image. 107K is the JPG image bytes. 107H 107J 107K repeat for each image written to the directory in 6C-99B. 107L is a NMEA marker a constant integer identifying the start of the NMEA section in the file. 107M is the NMEA header which defines the start and length of the NMEA data string. 107N is the NMEA data string.

108—Defines the file encoding sequence as the following steps

Put empty File Header in 107
Put Summary XML Marker in 107
Read the length of our Summary XML file Summary Header and put in 107
Put Summary XML in 107
Put Course XML Marker in 107
Read the length of our Course XML file Course Header and put in 107
Put Course XML in 107
For each image I1 in video images directory
Put Image Marker in 107
Read the length of our image I1 in images directory into Image Header
Increment FrameID into Image Header
Put Image Header in 107
Put Image in 107
Next Image
Pun NMEA course marker in 107
Read the length of our NMEA course into NMEA Course Header and put in 107
Put NMEA Course in 107
Seek to the beginning of 107 and insert an updated File Header with updated position info.

File is now assembled.

FIG. 6F Enhance the created file in 6E with scripts that define actions that are optionally assigned to waypoints in the course XML data. 115A—The user selects a position within the course identified as a waypoint they wish to add an action to. 115B The script is a standard Visual Basic script with the following function definition a(a1,a2,a3,a4,a5) where a( ) is always the function name and a1,a2,a3,a4,a5 are input parameters to the script. The function may contain any valid visual basic script defined by the user creating the function. An example of a script command is as follows:
Sub a("1609","1","","","")
MsgBox("Congratulations",vbInformation,"You just ran" & a1 & "meters or "& a2 & "miles!")
Exit sub In the above script a message box is displayed showing the distance the runner just ran.

Examples of useful script commands would be to launch a video or sound file of a trainer describing the course, displaying motivational text to the user, playing sound files that match the terrain they are traveling over, or launching an internet browser window describing the course they just ran.

115C—Once all scripts have been defined and inserted by user rebuild the course XML and insert back into binary encoded course file 107.

115D—During playback, the resulting course file with updated script commands will be executed when the user passes a waypoint with a script defined.

Figure 7A:
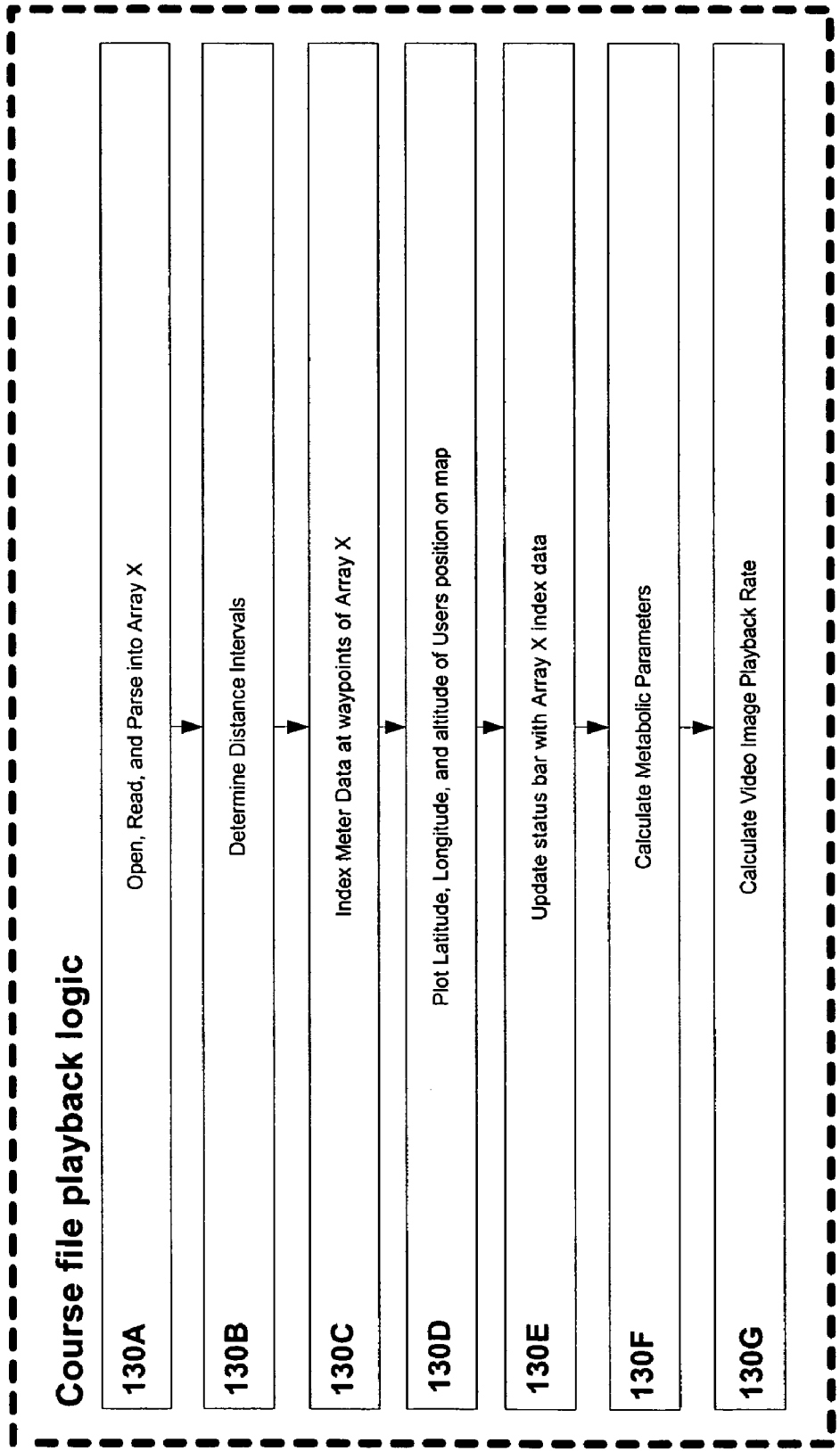
FIG. 7A is a description of the course file playback logic.
Figure 7B:
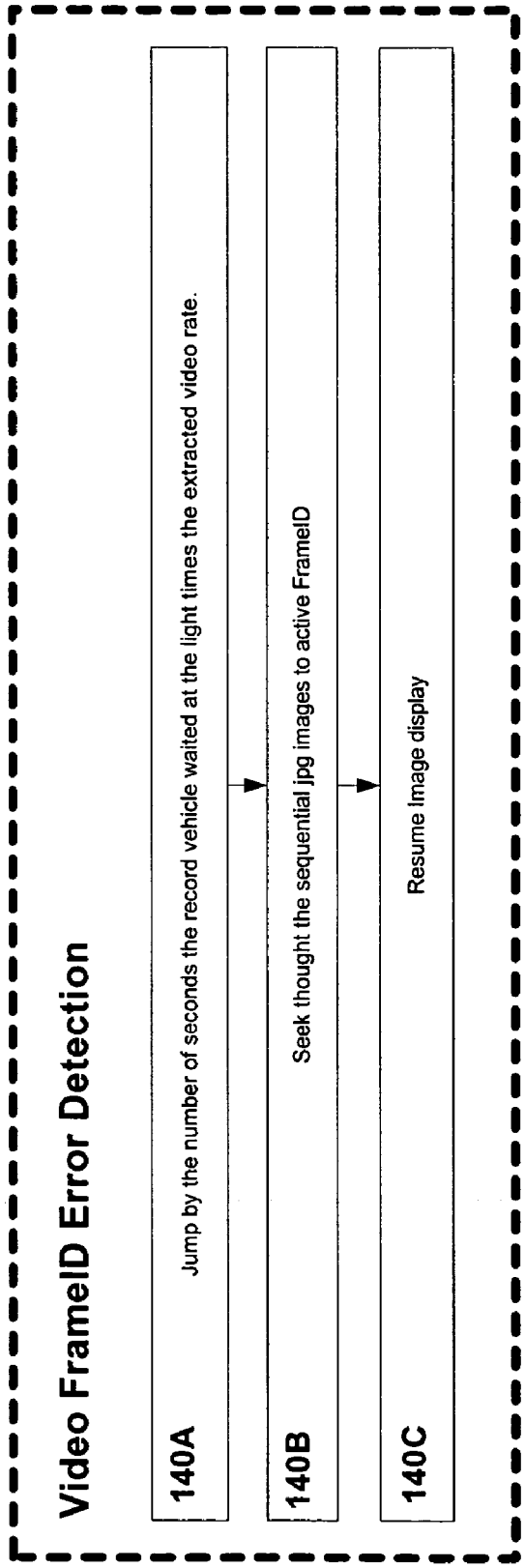
FIG. 7B is a description course file playback Video FrameID error detection.

FIG. 7A 130A For playback of a course file 107 created in FIG. 6A open the file and read out the course XML and parse into an array X. 130B Use the playback users speed to determine meters elapsed every 1 second where speed and time give us distance. 130C Meters elapsed is synonymous with array X index as each waypoint or array member is 1 meter from the next. Use this index value to reference data specific to the user's current location within the virtual course. 130D During playback latitude, longitude, and altitude are used to plot the users position on a map, 130E— Index value or meters elapsed are used to plot the status bar on the chart. 130F Metabolic parameters are calculated given users speed, course incline and users given users age, weight, and gender. 130G Video image playback frame rate is calculated given the waypoint record speed "SOG", extracted frames per second rate of the AVI, and the user current speed using the following formula: Playback frame rate=(30*4.2)/13.2=10.3 fps 10.3 is the frames per second rate to display video frames given:
Record Frame Rate=30 fps
Record Speed=13.2 mph
Playback speed=4.2 mph That is, a preferred embodiment to determine the record and playback parameters at a way point is:
Record Frame Rate=30 fps
Record Speed=13.2 mph
Playback speed=4.2 mph
Playback frame rate=(30*4.2)/13.2=10.3 fps FIG. 7B—It is possible for the displayed video FrameID to become out of sync with the waypoint array FrameID. One cause of this is if the record vehicle stops at a light for duration then begins driving again. The video record process does not stop however; no distance is being added to the record NMEA file therefore record time over distance will be invalid when this waypoint is reached within the distance formatted array during the playback process. In 6D a waypoint array containing 1 meter intervals between waypoints is constructed including FrameID and SOG "speed over ground" from the time synchronized time waypoint array.

140A During playback of a course file a user traveling through a position on the course where the record vehicle stopped may be viewing 10 fps but when they pass the point where the record vehicle stopped the FrameID will jump by the number of seconds the record vehicle waited at the light times the extracted video rate.

140B—To synchronize the users position with the currently displayed video frame a seek is performed within the binary encoded course file unit we reach the encoded image header where the ImageHeader.FrameID 6E is greater than or equals the FrameID of the current waypoint where the current waypoint is determined by the users speed and distance traveled sampled at 1 second intervals during the playback of the course.

140C At the position in the waypoint array where the FrameID matches the users position on the course, video frame display is reactivated at the rate defined in 130A as the users current meters elapsed.

Figure 8A:
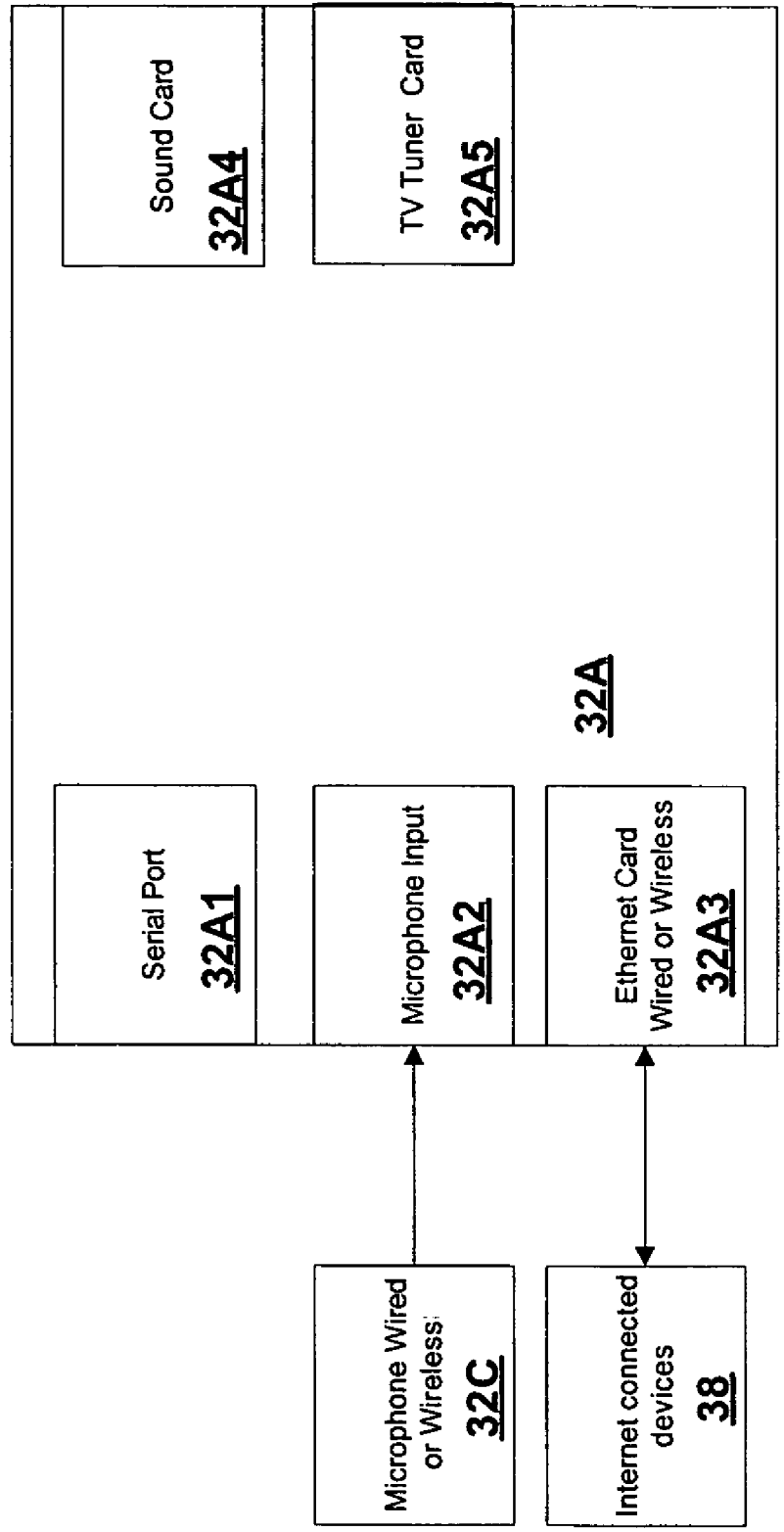
FIG. 8A is the playback application hardware connections.

FIG. 8A is the playback application hardware connections and includes a serial port 32A1 as part of the first user computer 32A. Within the first user computer 32A is a microphone input 32A2, which receives microphone wired or wireless communication from the microphone 32C. Within the personal computer 32A is an Ethernet card wired or wireless port 32A3 which communicated with internet connected devices 38. 32A5 is a TV tuner card providing the PC a TV signal. The first user computer 32A also has a sound card 32A4.

Figure 8B:
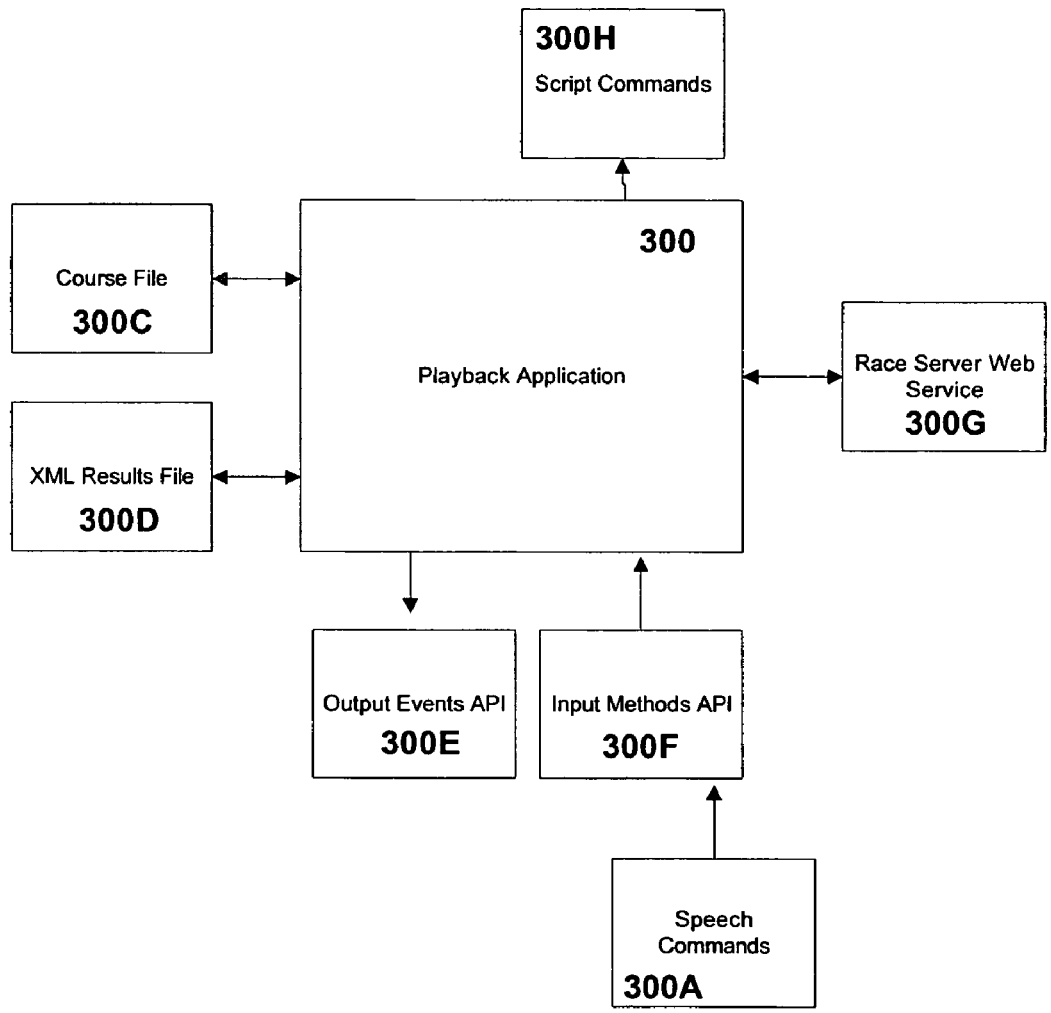
FIG. 8B is a functional software block diagram for the playback application 300.

FIG. 8B is a functional software block diagram for the playback application 300. The software connections includes speech commands from block 300A, Course file data from block 300C including course XML summary XML sequential images, and NMEA data file, XML results files from block 300D. The XML results files are written and read from the playback application 300. Outputting from the playback application 300 is output events API software connections 300E. Inputting to the playback application 300 are input methods API from block 300F. In two-way communication with the playback application 300 is the Race Server Web Service software block 300G. Outputting from the playback application 300 are Script Commands 300H that are defined in course file 300C.

FIG. 9A is a processing speech commands of the speech command block 300A. The processing speech command begins with the first step 121, which creates a Microsoft SAPI speech recognition object in a Microsoft SAPI speech engine. The next step is step 123 which imports a list of commands to recognize the object speech from the Speech-.dat XML file. The speech.dat XML file in step 124 is formatted and defined in the Microsoft SAPI speech documentation listing. After the list of commands are imported, the next step is step 125, which the application is now prime for actively listening for incoming speech commands.

FIG. 9B is a data sentence example of speech commands 300A as shown and comprises three steps, step 127, 129, and 130. Step 127's speech commands are processed by the object speech and an event is raised for each incoming speech command with the following sentence structure as shown on block 127. The block is then terminated with step 129 where the incoming speech command is passed through a select case block to take appropriate action. Individual commands are then sent to the Inbound API handler 130 and executed. This allows $3^{rd}$ party application to control the playback application the same as a speech command does.

An example for taking appropriate action occurs in the case when an incoming speech command is GOFASTER. The appropriate action is to click the Go Faster button in the playback application 300.

Figure 10:
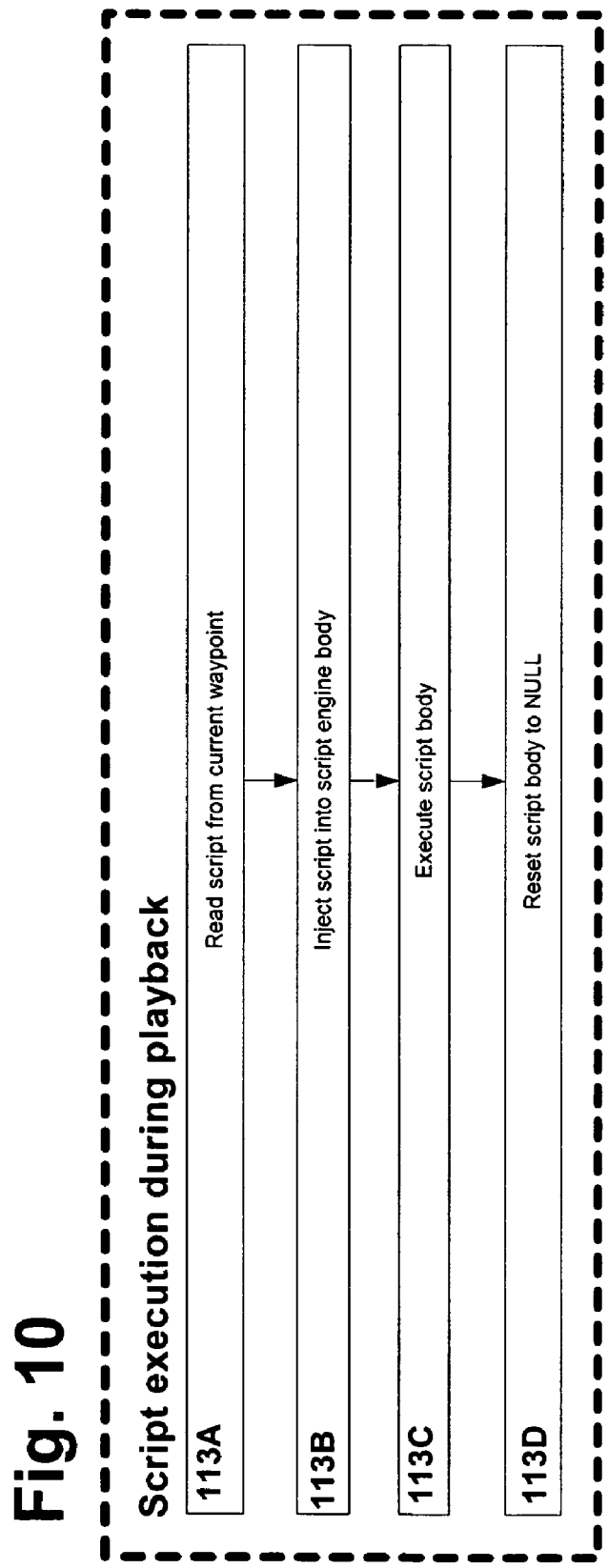
FIG. 10 is a sequence for executing user defined scripts during playback.
Figure 11:
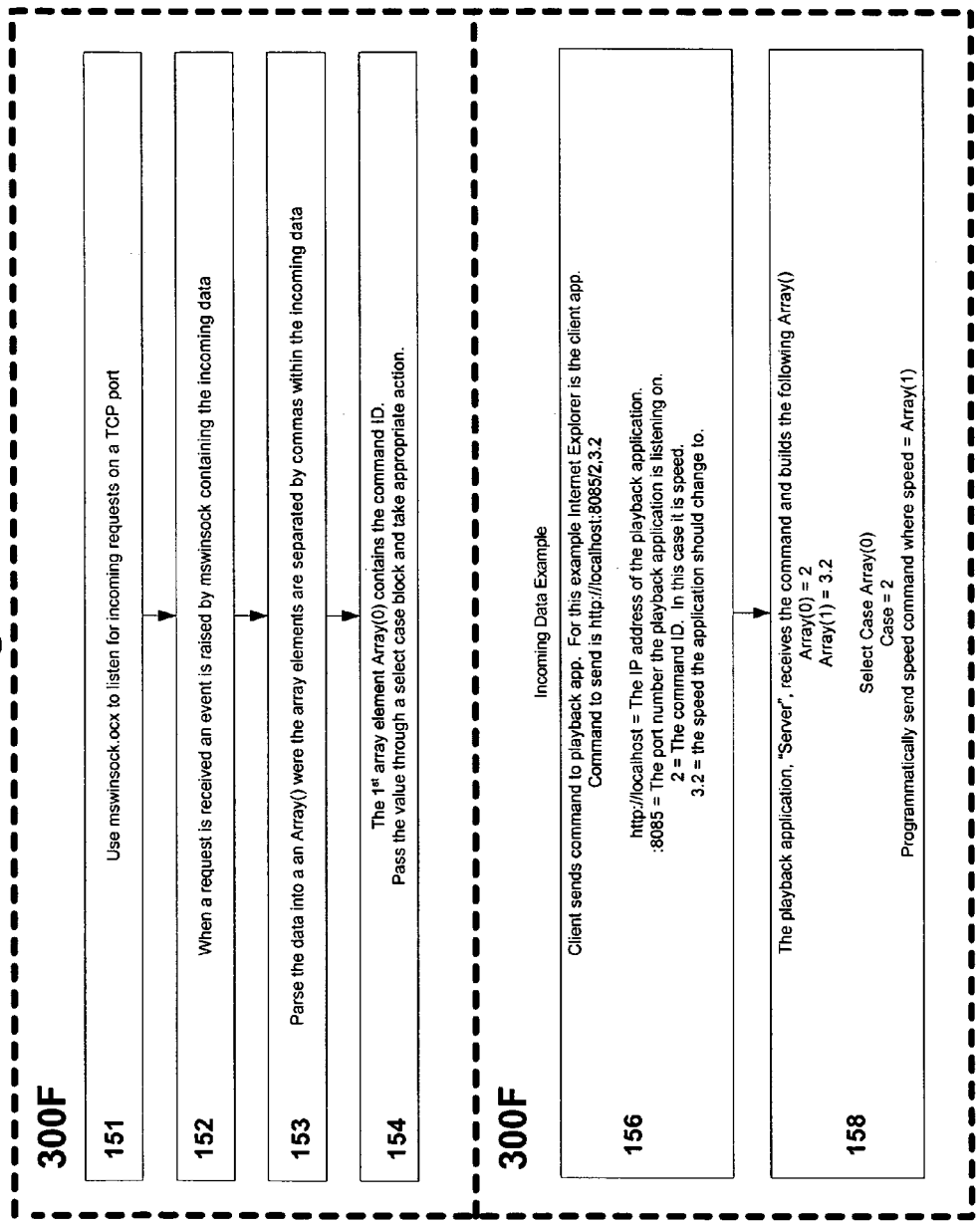
FIG. 11A is a software flow chart of the input methods API function block 300F.
FIG. 11B is an example of an application of incoming data to the application programming interface.

FIG. 10 is a sequence for executing user defined scripts during playback. User of playback application passes waypoint containing a script command 113A. Script function is loaded into the Microsoft Script Control using the Add Code( ) method 113B. The script is then executed using the Run( ) method of the Microsoft Script Control 113C. The Script Control is this reset using the Reset( ) method bring it back to an idle state. A script can be used for any user defined action supported by the Microsoft Script Control.

FIG. 11A is a software flow chart of the input methods API function block 300F. The first step is step 151 where mswinsock.ocx commands are used to listen for incoming requests on a TCP port. Thereafter, the second step 152 is where requests are received with an event that is raised by the mswinsock and contains incoming data. The third step is step 153 where the data is parsed into an array from step 152 into elements that are separated by commas within the incoming data from step 152. The fourth step is step 154 where a first array element (0) contains command ID. Thereafter, the value through a selected case block and the software takes appropriate action.

FIG. 11B is an example of an inbound API event being raised. The first block is 156 which represents incoming data example of an internet explorer client application where commands are sent as http://localhost:8085/2,3.2. Internet explorer is used for this example but any tool or code capable of sending TCP/socket commands can be used. Thereafter, the second block 158 the playback application server receives the command and builds the following array from the inbound data: Array (0)=2, Array (1)=3.2, a Select Case Array (0) and a Case=2 is programmatically sent by speed command where speed array is equal to Array (1)

Figure 12:
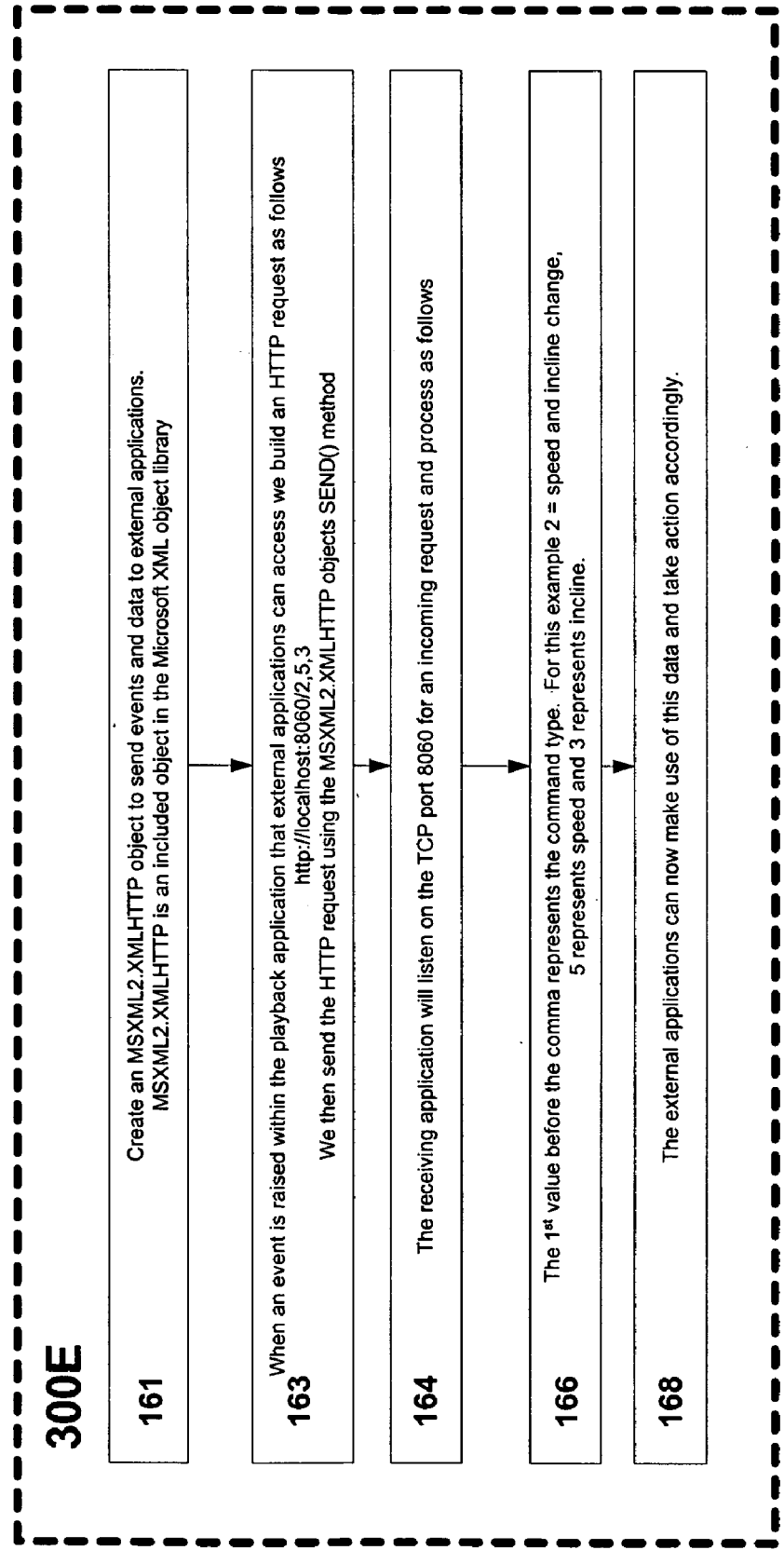
FIG. 12 is a software programming flow chart of output events API 300E.

FIG. 12 is a software programming flow chart of output events API 300E and begins in step 161 where programming sentences MSXML2.XMLHTTP objects send events and data to external applications. In step 163, as events are raise within the playback application are accessible by external applications, HTTP requests are built. The next step is 164 where the receiving application listens on the TCP port 8060 for an incoming request and process as follows. Thereafter, the fourth step 166 is initiated where the first value before the comma represent the command type. For this example 2=speed and incline change, 5 represents speed and 3 represents incline. The last step is 168 where the external applications, which can now make use of the data and take action accordingly.

Figures 13A, 13B:
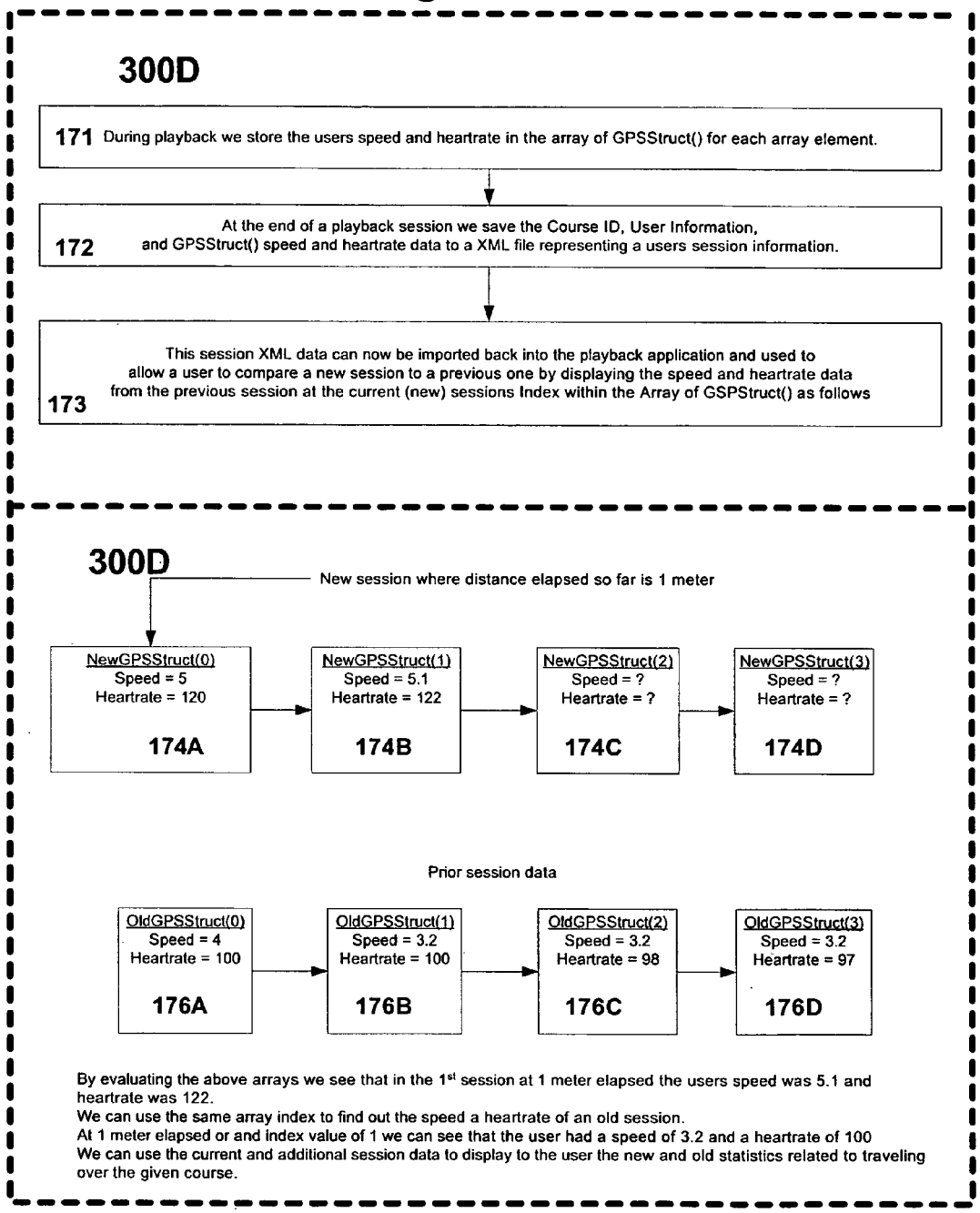
FIG. 13A is a software flow diagram of the XML results file function block 300D.
FIG. 13B is an example of new session where distance elapsed is set to 1 meter.

FIG. 13A is a software flow diagram of the XML results file function block 300D. The first software step is step 171 wherein the user speed and heart rate in the GPS Struct array is stored during playback for each array element. The second step is 172 in which the end of each playback session, the course ID user information, and GPSStruct are saved. Furthermore, the speed and heart rate data of each XML file is represented as user session information. The third software step is 173 in which the session XML data is imported back into the playback application 300 and used to allow each user to compare a new session to a previous session by displaying the speed and heart rate data from the previous session at the current (new) sessions index within the array of the GSP Struct. An example of the software flow diagram of software block 300D is shown in FIG. 13B.

FIG. 13B is an example of new session where distance elapsed is set to 1 meter. An example of the plurality of new GPS Struct data files shown in block 174A, 174B, 174C, and 174D and is compared with prior session data block of old GPS Struct data arrays as described in blocks 176A, 176B, 176C, and 176D. By evaluating the above arrays as shown in FIG. 13B we see that the first session at 1 meter elapsed distance user speed was 5.1 and the heart rate was 122 beats per minute. The same array index can be used to find the speed of an old session. For example at a 1 meter elapsed or at an index value of 1 we can see that the user had a speed of 3.2 and a heart rate of 100 beats per minute. The current and additional session can be used to display to the user and display to each user and the new and old statistics related to traveling over the given virtual racecourse.

Figure 14:
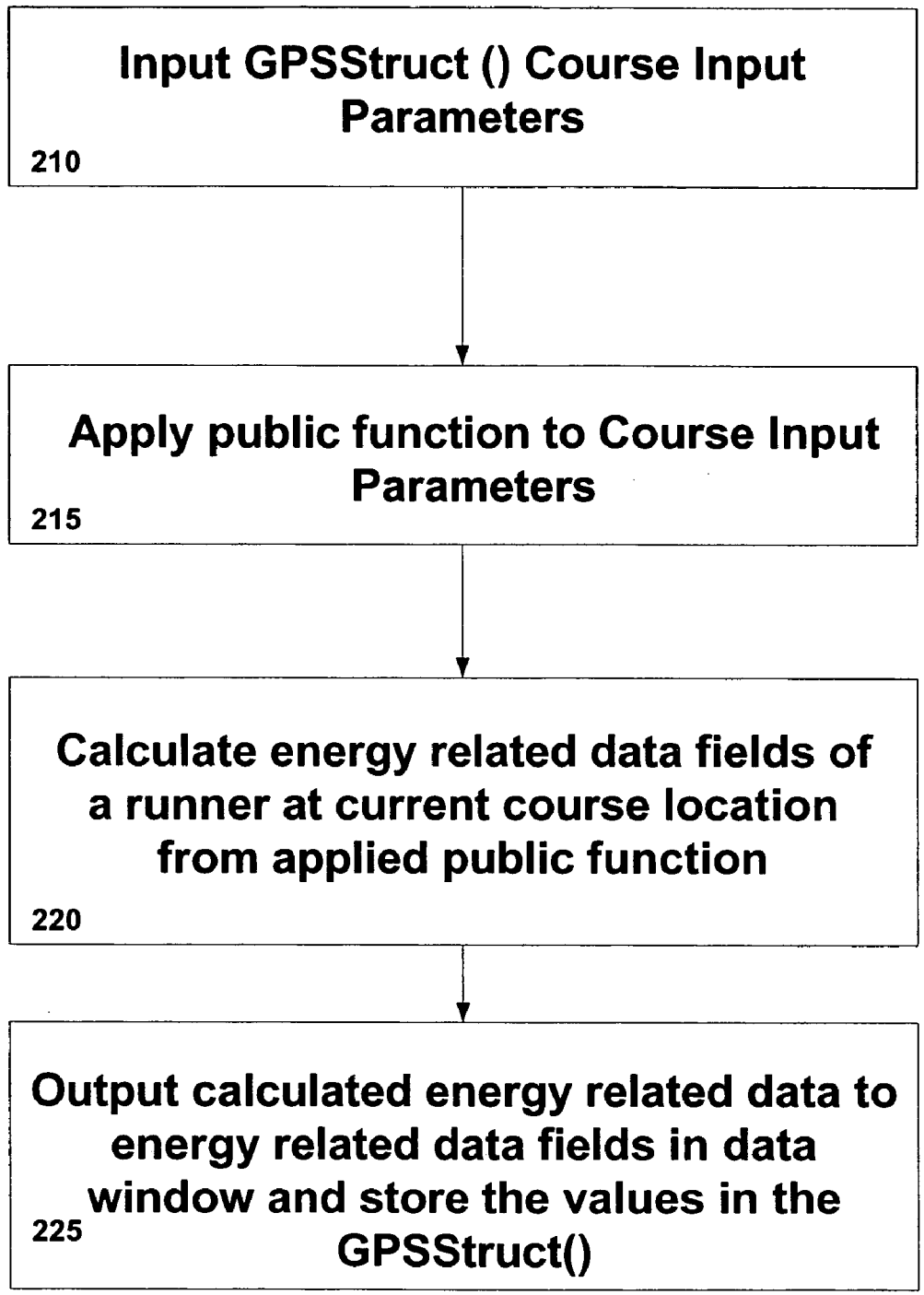
FIG. 14 is an example of energy calculations used to display physiological parameters on the playback application screenshots.

FIG. 14 is an example of energy calculations used to display physiological parameters on the playback application screenshots as a runner travels over a course. Based on the reference *Practical Math for Health Fitness Professionals* by Dennis K. Flood ISBN 0-87322-758-1 Chapters 7, 8 & 9, herein incorporated by reference, examples of energy calculations begin with input parameters as indicated in block 210. The input parameters include dTimeInSeconds defined at the time elapsed for calculation, dWeightKG defined as the user's weight, dSpeedKPH defined as the speed the user is traveling, and dGrade defined as the vertical incline. At a given location in the course index of GSPStruct( ) the input parameters for the function is known below and the output parameters of the function is used to display the energy related data fields in the data window. Additionally, an oxygen sensor can be used to provide a more accurate representation of VO2 Max.

Thereafter, a public function is applied to the inputted course parameters in block 215. For example, a public function named GetEnergy( ) is inputed with these command sequences: (ByVal dTimeInSeconds As Double, ByVal dWeightKG As Double, ByVal dSpeedKPH As Double, ByVal dgrade As Double, ByRef dVO2LitersTotal As Double, ByRef dVO2LitersUptake As Double, ByRef dKcalsBurned As Double, ByRef dWatts As Double, ByRef dMets As Double, ByRef dFatBurnedGrams As Double)

```
'OUTPUTS
'dVO2LitersTotal
'dVO2LitersUptake
'dKcalsBurned
'dWatts
'dMets
'dFatBurnedGrams
Dim dMetersPerMinute As Double
Dim dVO2LitersMinute As Double
Dim dKcalsMinute As Double
Dim dFatBurnedMinute As Double
Const KCALS_TO_1_LITER_OF_O2 As Double = 5
Const ONE_KCALMINUTE_TO_WATTS As Double = 69.767
Const KCALS_TO_1_POUND_OF_FAT As Double = 3500
dMetersPerMinute = dSpeedKPH * 16.7
        If dSpeedKPH >= 5.9545728 Then '3.7 mph Average
            dVO2LitersTotal = 0.2 * dMetersPerMinute +
            ((dGrade / 100) *
            dMetersPerMinute * 0.9) + 3.5
        Else
            dVO2LitersTotal = 0.1 * dMetersPerMinute +
            ((dGrade / 100) *
            dMetersPerMinute * 1.8) + 3.5
        End If
    dVO2LitersMinute = dWeightKG * dVO2LitersTotal / 1000
    dVO2LitersUptake = dVO2LitersMinute / 60 * dTimeInSeconds
    dKcalsMinute = dVO2LitersMinute *
    KCALS_TO_1_LITER_OF_O2
    dKcalsBurned = dKcalsMinute / 60 * dTimeInSeconds
    dWatts = dKcalsMinute * ONE_KCALMINUTE_TO_WATTS
```

-continued

```
'1 [lb->g] 453.5924' grams to 1 pound
dFatBurnedMinute = (1 / KCALS_TO_1_POUND_OF_FAT) *
dKcalsMinute
dFatBurnedGrams = ((dFatBurnedMinute / 60) * dTimeInSeconds) *
453.5924
'3.5 VO2 = 1 Met
dMets = (1 / 3.5) * dVO2LitersTotal
End Function
```

In block 220 the returned calculated values from 215 are added to the existing values to compute the sum of values at a the current position within the course and saved for next reference to existing values.

In block 225 Energy related data is outputted to energy related data fields on the computer monitor for display.

The physiologic-related data is outputted and inserted into the data window bar 304 as shown in the screen shoot of FIG. 3. The above also applies for race participants as the race status XML contains all of the input parameters needed for the function below.

Figure 15:
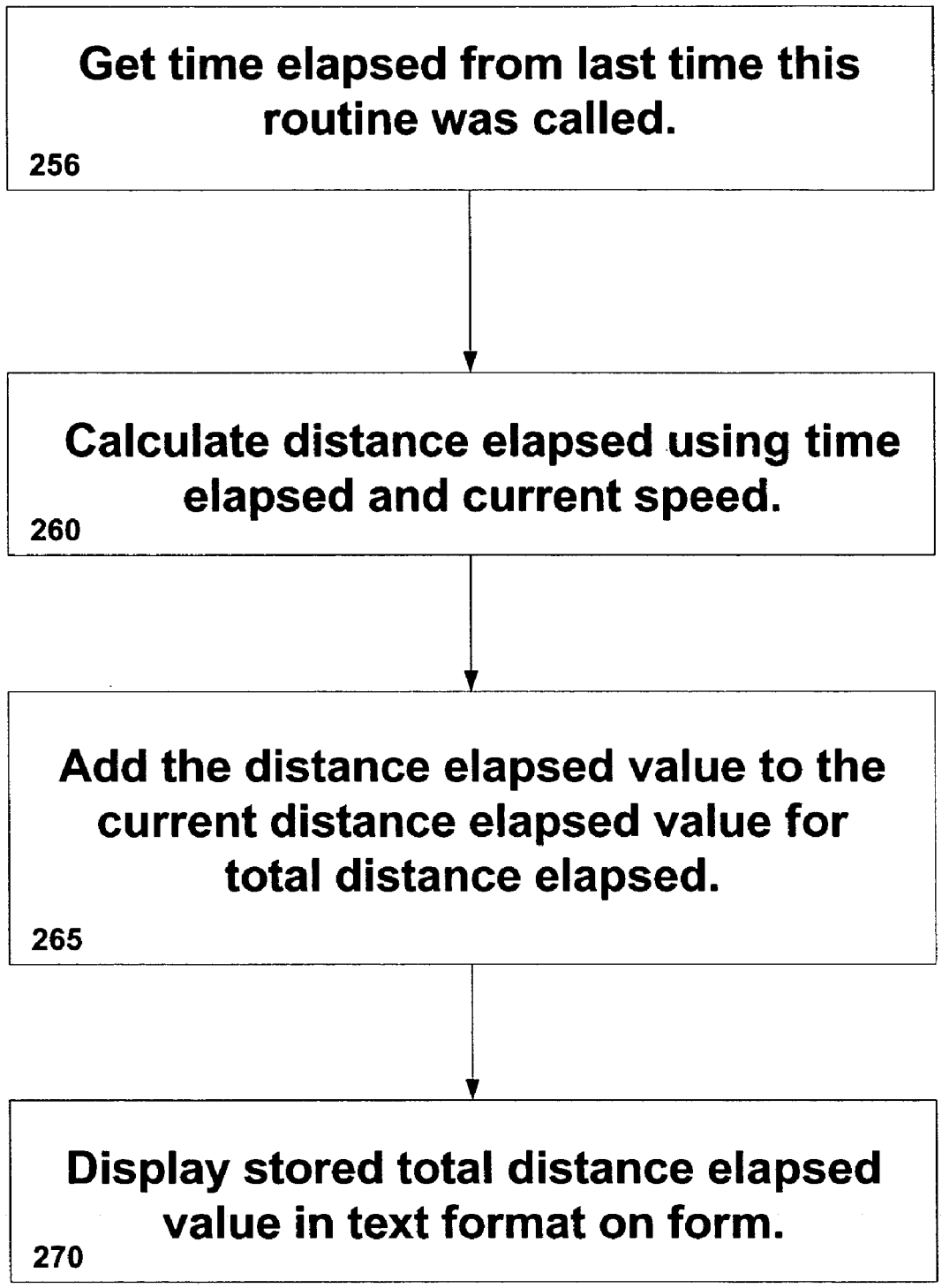
FIG. 15 is an example of distance elapsed calculations to be displayed on the playback interface.

FIG. 15 is an example of distance elapsed calculations to be displayed on the playback interface. Beginning with block 256, the time to calculate distance is retrieved. This is called on a timer every 1 second, however the time can vary up to $100^{th}$ of a second, therefore we subtract from last time this routine was called to get the exact time. This value is stored in Active.ActiveTimer.TimerWatch.Difference. Block 260 calculates the distance elapsed of a runner. Calculation is achieved using the following function where speed and time return distance elapsed of a runner or pace runner as follows:

```
Active.ActiveTimer.DistanceElapsed =
Active.ActiveTimer.DistanceElapsed +
GetMetersElapsed(Active.Workout.Calculated.CurrentSpeed,
Active.ActiveTimer.TimerWatch.Difference)
DistanceElapsed in step 260 uses the "GetMetersElapsed" function
as follows:
    Public Function GetMetersElapsed(dKilometersPerHour
    As Double, dTimeInSeconds As Double) As Double
    'input is km/h
    'output is meters
    Dim dRetVal As Double
        dRetVal = ((dKilometersPerHour * 1000) / 3600) *
        dTimeInSeconds
        GetMetersElapsed = dRetVal
    End Function
```

After calculating the distance elapsed, we add the value DistanceElapsed to the existing DistanceElapsed for our new DistanceElapsed value as shown in block 265.

In block 270, DistanceElapsed is expressed in Text format of the Data Form 304. The distance elapsed in meters represents the index value for the Array of GPSStruct( ) data that is looked up as needed to plot the latitude longitude icon position on the map, and display the status bar at the distance elapsed position.

The racecourse-related data is outputted and inserted into the data window bar 304 as shown in the screen shot of FIG. 3.

Figure 16:
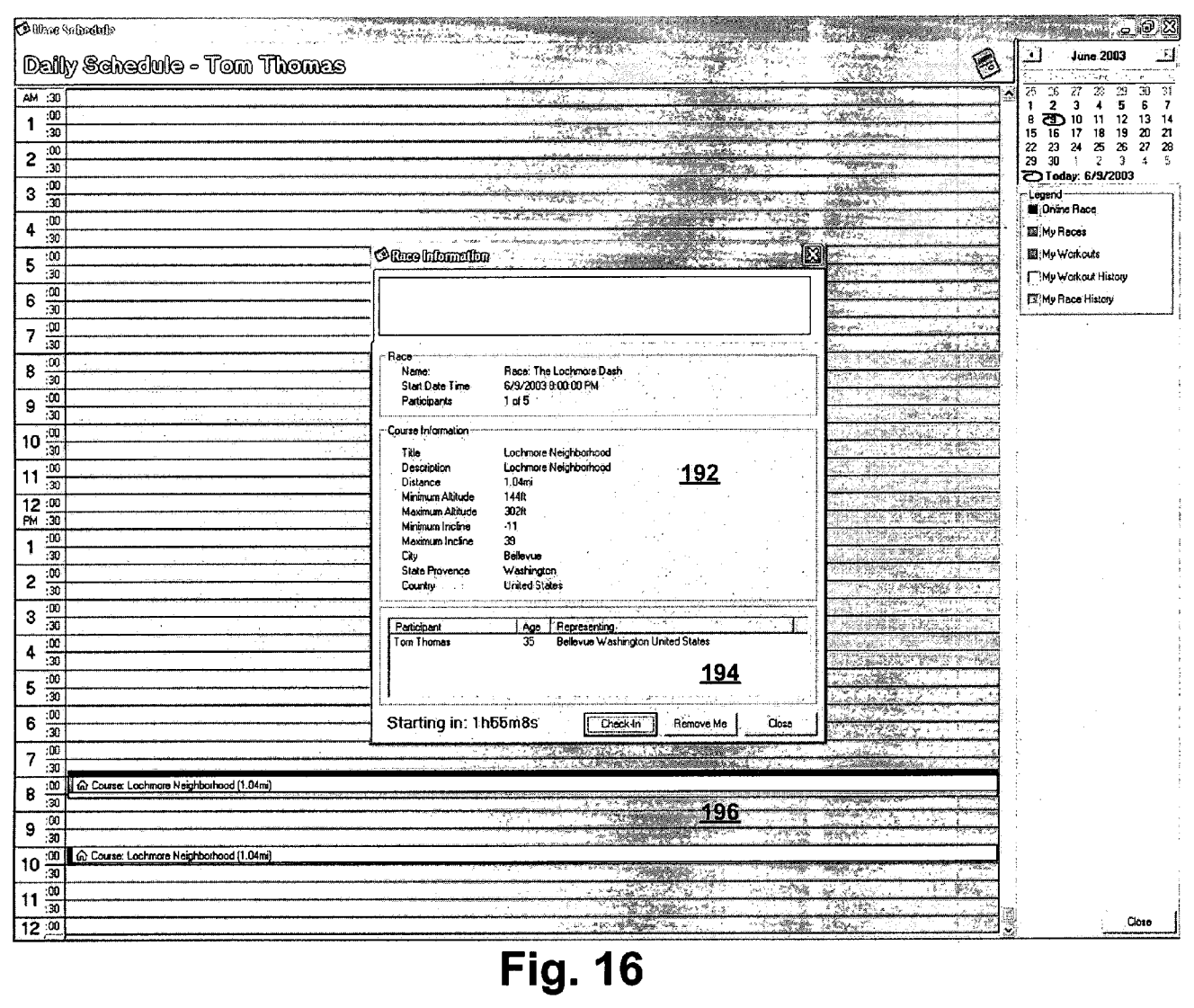

FIG. 16 is a screenshot showing race detail schedule and appointments. An appointment dialog box 192 appears on the screenshot as race information. The race dialog box includes the name of the competitor, the start date time which is scheduled the number of participants, course information including title of the course, the description of the course, the distance of the course, the minimum altitude of the course, the maximum altitude of the course, the minimum incline of the course, the maximum incline of the course, the city, the state, and the country the course is located in. In the dialog box 192 is the name of the participants, age, and the organization they represent in the box 194. Also within the dialog box, is the starting time, the time checked in, and options for removing the participants in a close box. Box 194 describes race participants, which are retrieved from the Race Server Web Service from which appointments and results of the race course competition is reported in the results section 196.

Figure 17:
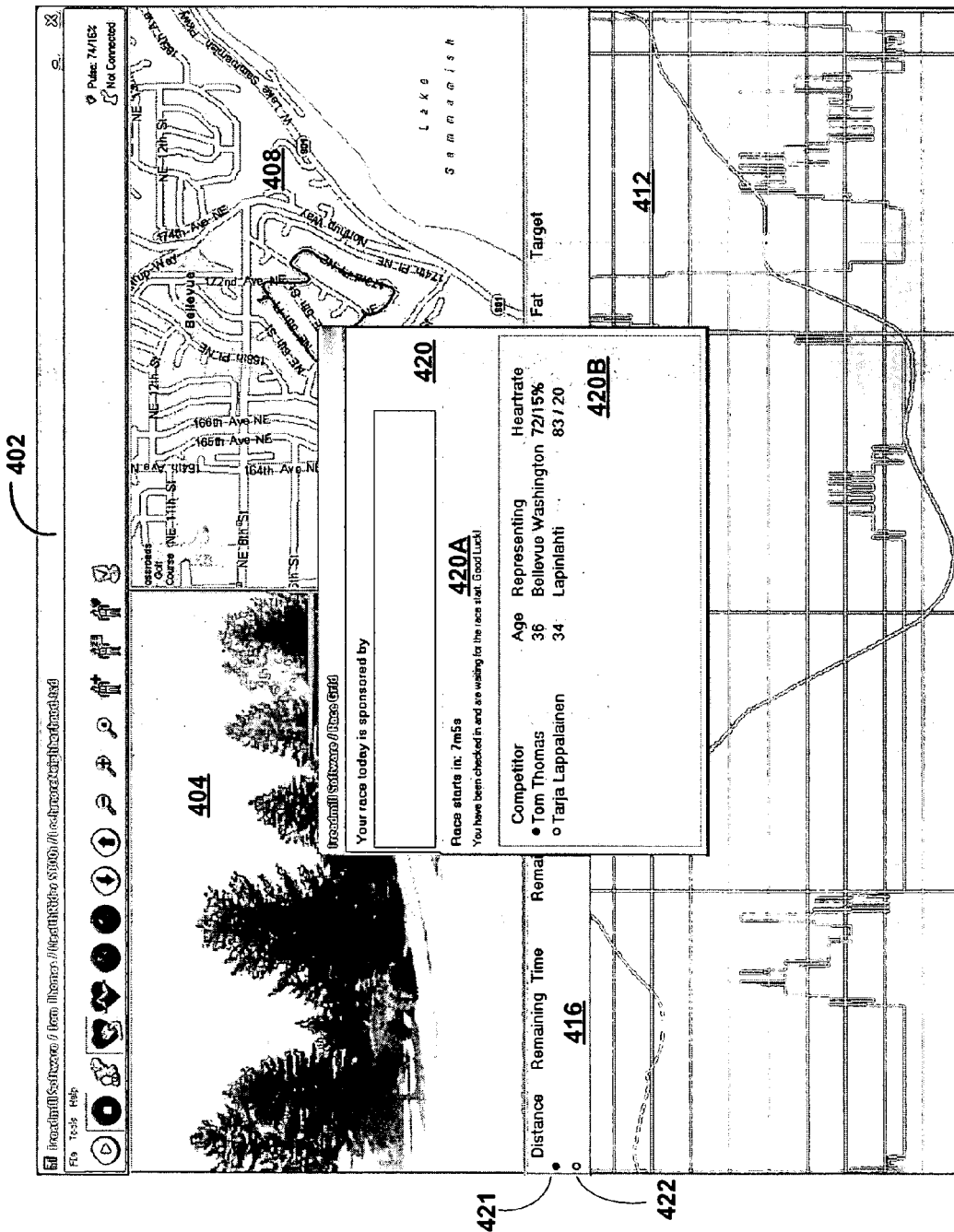
FIG. 17 is a playback application screenshot at the start of a race.

FIG. 17 is a playback application screenshot at the start of the race between two competitors. A screenshot 402 depicts a countdown to begin starting the race between two virtual competitors. The data being displayed is retrieved from the race server FIG. 1-40. The screenshot 402 shows a digital image 404, a map 408, a graphic chart 412, a data bar 416, and a dialog box 420. In 420A of the dialog box 420 shows the countdown time to indicate the beginning when the race will begin. In 420B of the dialog box 420 shows the race participants or competitors who have joined the race grid for the race appointment and the race calendar of FIG. 16. Section 420B lists the name of the competitor, their ages, who they represent, and heart rate data of each. On the data window 416 is shown participant or competitor icons, specifically in this example, a first competitor icon 421 and a second competitor icon 422. More icons can be inserted in the data window 416 as more competitors sign-up to treadmill race.

Figure 18:
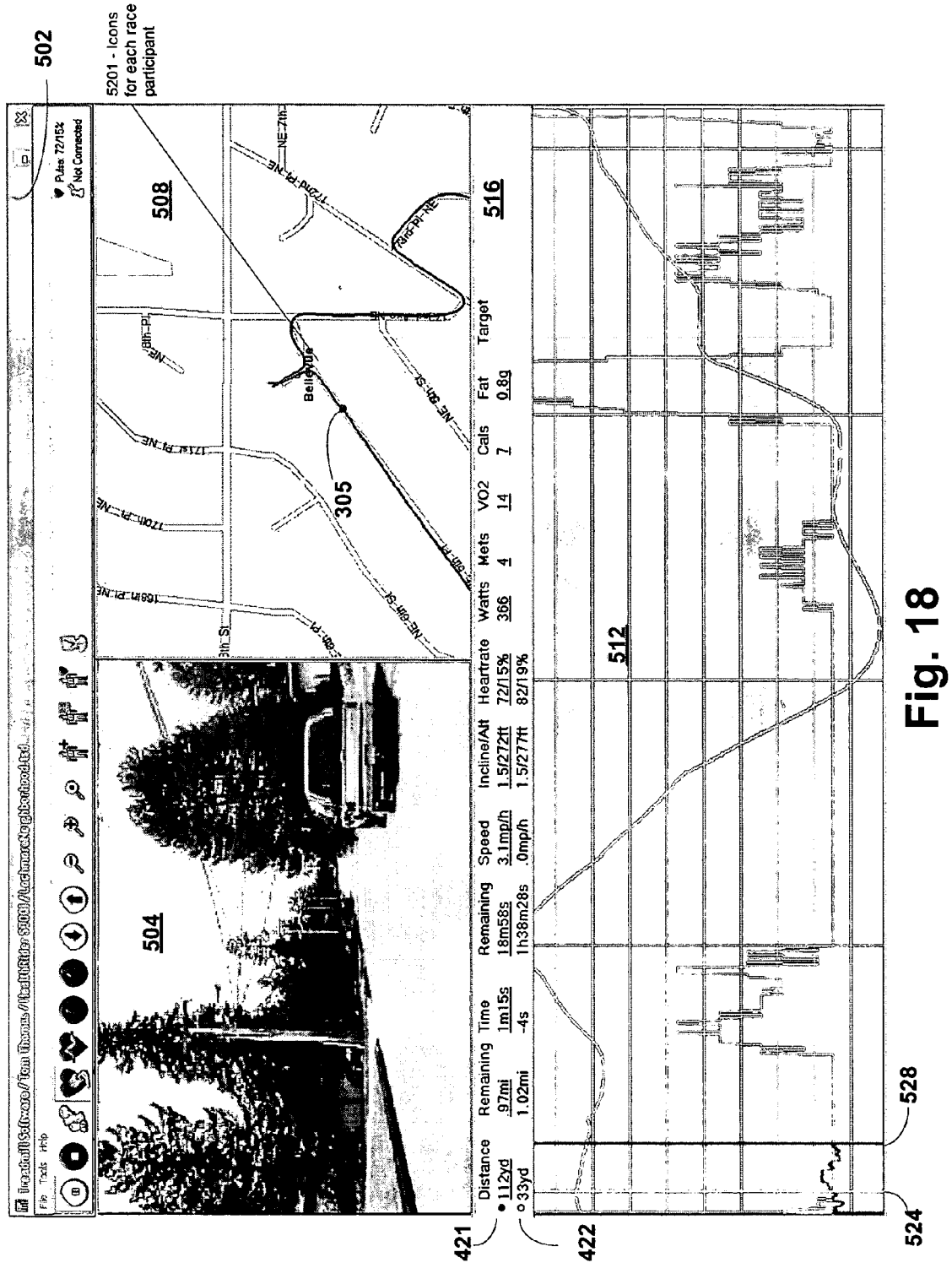
FIG. 18 is a playback application screenshot during a race.

FIG. 18 is a playback application screenshot 502 of a virtual race in-progress between two competitors. Screenshot 502 depicts a digital image 504, a map 508, a graphic chart 512, and a data bar 516. The map 508 shows the position icon 305 of each runner. In the data window 516, adjacent to the first and second competitor icons 421 and 422, are racecourse-related and physiologic-related data for each virtual racer that is updated as the race progresses. In the graphic chart 512 is a first status bar 524 and a second status bar 528 that moves for each runner as the race progresses.

The program file listings for the Virtual Exercise System is listed in Appendix 1 and includes readme text files for the preferred and alternate embodiments of the instant application. The file listings are herein incorporated by reference. The program file listings include the file names, sizes in bytes, and dates of creation. The software source code is provided on a single CD-R disk submitted with the application upon filing. Labeling information on the CD-R disk includes "Virtual Exercise System, Source Code & Setup Kit; Created Aug. 9, 2004; application Ser. No. 10/918,773; Inventor Tom Thomas; Black Lowe & Graham, 701 Fifth Avenue, Suite 4800, Seattle, Was. 98104; 206.381.3300". The source code requires Visual Basic 6. The Virtual Exercise System software program is operable by an IBM Personal Computer equipped to run Windows Operating System 98, 98ME, 2000, and XP. The source code for the Virtual Exercise System on the submitted CD-R disk is herein incorporated by reference.

A CD-ROM titled *Video of Virtual Exercise System* (Created Aug. 9, 2004; application Ser. No. 10/918,773; Inventor Tom Thomas) is submitted with the application and herein incorporated by reference. The CD-ROM contains a video clip in a WMV format operable by Windows Media Player 9 or higher in an IBM Personal Computer configured to run Windows 2000 or Windows XP operating system. Selected screen shots from the CD-ROM's video clip are shown in Appendix 2 covering an approximate 7-minute photo sequence. The screen shots of the video clip demonstrate a representative portion of the operation of the treadmill in the Virtual Exercise System. In the video clip and in the photo sequence in Appendix 2 the progress of a runner in approximately 1-minute increments over a virtual racecourse is demonstrated. Labeling information on the CD-ROM disk includes "Video of Virtual Exercise System, Created Aug. 9, 2004; application Ser. No. 10/918,773; Inventor Tom Thomas; Black Lowe & Graham, 701 Fifth Avenue, Suite 4800, Seattle, Wash. 98104; 206.381.3300".

While the preferred embodiment of the invention has been illustrated and described, as noted above, many changes can be made without departing from the spirit and scope of the invention. Other virtual and remote competition based games or training routines can be accomplished with this invention. For example, racing via stationary bicycles, rowing machines, automobiles, or flight and combat training may be accomplished with the system and methods of the invention, each having its own set of realistic images, maps, sounds, and updated with physiologic and non-physiologic data reports and displays. Accordingly, the scope of the invention is not limited by the disclosure of the preferred embodiment.

I claim:

1. A method of using a virtual exercise system comprising:
   acquiring a plurality of digital images and storing in a microprocessor based device;
   associating the digital images with coordinates from a global positioning system and an inclinometer device whereby images, global positioning system data, and inclinometer data are stored to form a virtual racecourse in a single file for variable frame rate playback;
   associating script routines with global positioning system coordinates that perform a user defined action on the microprocessor based device,
   controlling an exercise system from the computer;
   displaying the plurality of digital images, global positioning system data, and inclinometer data on a monitor in distance increments of the virtual racecourse; and
   operating the exercise system for a period of time determined by the global positioning system distance data, and speed of the playback.

2. The method of claim 1, wherein the period to achieve the distance value is variable and adjustable.

3. The method of claim 1, wherein the script routines comprises Visual Basic script subroutines inserted into the file and executed when the global positioning system data position is reached during playback.

4. A virtual exercise system comprising:
   an exercise device for generating device information;
   a physiologic measuring device attached to a user operating the exercise device, the physiologic device in signal communication configured to generate physiologic signals;
   a computer in signal communication with the device, the computer having a first program to access a pre-stored virtual racecourse image file, the racecourse having global positioning data, a second program to display the physiologic signals, and a third program to display a plurality of digital images of the virtual racecourse with the global positioning data, the physiologic signals, and the device information; and
   a monitor in signal communication with the computer configured to present the plurality of digital images, the global positioning data, the device information, and the physiologic signals in distance increments of the racecourse,
   whereby the user operates the virtual exercise system at a rate in response to the display of the image file of the racecourse and data is sent from the physiologic measuring device, stored on the computer, and presented on the monitor.

5. The virtual exercise system of claim 4, wherein the virtual exercise system includes a treadmill, the treadmill having device information comprising running speed and inclination data.

6. The treadmill of claim 4, wherein the physiologic measuring device includes a pulse rate monitor, a respiration monitor, and an oxygen sensor.

7. A virtual treadmill comprising:
   a computer in signal communication with a treadmill and an internet server, the computer having instruction to research, store, and access a virtual racecourse;
   a display presenting a plurality of digital images, global positioning data and inclinometer data obtained from the recorded course file; and
   a physiologic measuring device attached to a user, the physiologic device in signal communication with the computer,
   whereby the user operates the treadmill at a rate in response to the image file racecourse display and data is sent from the physiologic measuring device, stored on the computer, and presented on the display.

8. The virtual treadmill of claim 7, wherein multiple users can participate in traveling a virtual course by exchanging global positioning data and physiologic data by way of a connection to a server on the internet.

9. A method to use a virtual exercise system comprising:
   acquiring a plurality of digital images in a computer;
   associating the digital images with coordinates from a global positioning system and data from an inclinometer, whereby a single file containing the data is created and is used for a variable frame rate playback where global positioning system data and inclinometer data are associated with the plurality of digital images;
   synchronizing global positioning system coordinates with a video frame rate and with mechanical parameters of a treadmill operated by a user;
   storing global positioning data and physiologic data on a server;
   controlling the application displaying the plurality of digital images, global positioning data, and inclinometer data from an external programming interface;
   controlling a exercise system device with the application displaying the plurality of digital images, global positioning data, and inclinometer data from an external programming interface;
   displaying the plurality of digital images, global positioning data, and inclinometer data on a monitor; and
   operating the treadmill for a period determined by the global positioning data distance value that is synchronized with the plurality of digital images and inclinometer data.

10. The method of claim 9, wherein the mechanical parameters comprises a speed, an inclination angle, and a resistance value.

11. The method of claim 9, wherein the coordinates are updated in intervals with the mechanical parameters.

12. The method of claim 11, wherein the intervals are in one-second increments.

13. The method of claim 11, wherein the video frame rate and mechanical data are synchronized with the coordinates and stored in the created course file.

14. The method of claim 13, wherein the course data file containing the plurality of digital images, global positioning data, inclinometer data, and script commands are a single binary encoded file.

15. The method of claim 13, wherein the synchronized coordinates are associated with waypoints of a racecourse.

16. The method of claim 15, wherein the waypoints are defined in 1-meter increments.

17. The method of claim 16, wherein inclination and racecourse waypoints are derived from global positioning data and inclinometer data and are synchronized to present a virtual racecourse depiction of the racecourse.

18. The method of claim 13, wherein the plurality of digital images, frames per second extract rate, record speed, sequential frame identifier, and physical position in the image header within the binary encoded course file, are stored within the synchronized coordinates that are encoded into the course file.

19. The method of claim 16, wherein each waypoint is one meter from the previous waypoint providing data to compute distance elapsed given speed over time.

20. The method of claim 19, wherein the mechanical parameters provided by the exercise system provide the data to compute and synchronize the active waypoint of the virtual racecourse.

* * * * *